(12) United States Patent
van der Goot et al.

(10) Patent No.: US 12,466,103 B2
(45) Date of Patent: Nov. 11, 2025

(54) AUTOMATIC STAPLE LOADING STATION

(71) Applicant: Kyocera Senco Industrial Tools, Inc., Cincinnati, OH (US)

(72) Inventors: Eddy Alfred Herre van der Goot, Harderwijk (NL); Tim Reinard Anne Lansing, Almere (NL); Max van der Puij, Harderwijk (NL)

(73) Assignee: Kyocera Senco Industrial Tools, Inc., Cincinnati, OH (US)

( * ) Notice: Subject to any disclaimer, the term of this patent is extended or adjusted under 35 U.S.C. 154(b) by 73 days.

(21) Appl. No.: 18/367,058

(22) Filed: Sep. 12, 2023

(65) Prior Publication Data
US 2024/0091979 A1    Mar. 21, 2024

Related U.S. Application Data

(60) Provisional application No. 63/406,177, filed on Sep. 13, 2022.

(51) Int. Cl.
| | | |
|---|---|---|
| *B27F 7/38* | (2006.01) | |
| *B27F 7/09* | (2006.01) | |
| *B27F 7/11* | (2006.01) | |
| *B27F 7/34* | (2006.01) | |
| *B27F 7/36* | (2006.01) | |

(52) U.S. Cl.
CPC ............... *B27F 7/38* (2013.01); *B27F 7/09* (2013.01); *B27F 7/11* (2013.01); *B27F 7/34* (2013.01); *B27F 7/36* (2013.01)

(58) Field of Classification Search
USPC ......................................... 227/120; 700/213
See application file for complete search history.

(56) References Cited

U.S. PATENT DOCUMENTS

| | | | |
|---|---|---|---|
| 10,052,100 B2 * | 8/2018 | Morgan | A61B 17/068 |
| 2012/0305623 A1 | 12/2012 | Kuchler | |
| 2018/0153550 A1 | 6/2018 | Souls et al. | |
| 2020/0086522 A1 | 3/2020 | Stoof et al. | |
| 2023/0065828 A1 * | 3/2023 | Forsell | A61N 1/0514 |
| 2023/0067834 A1 * | 3/2023 | Forsell | A61F 2/004 |
| 2024/0091979 A1 * | 3/2024 | van der Goot | B27F 7/38 |

FOREIGN PATENT DOCUMENTS

| | | |
|---|---|---|
| DE | 202012004646 | 7/2012 |
| JP | 2011251843 | 12/2011 |

OTHER PUBLICATIONS

PCT International Search Report for PCT/US2023/032475, mailed Feb. 2, 2024; 12 pages.

* cited by examiner

*Primary Examiner* — Praachi M Pathak
(74) *Attorney, Agent, or Firm* — Frederick H. Gribbell; Russell F. Gribbell; William E. Crouse

(57) ABSTRACT

An automatic fastener driving tool with an automatic side-loading magazine can be automatically loaded with fasteners via a high-capacity automatic loading station. The tool and the magazine are moved proximal to the loading station. The magazine door is automatically opened, and the loading station pushes fasteners into the magazine. The magazine door is automatically closed, and the tool and the magazine are moved back to their original position.

10 Claims, 34 Drawing Sheets

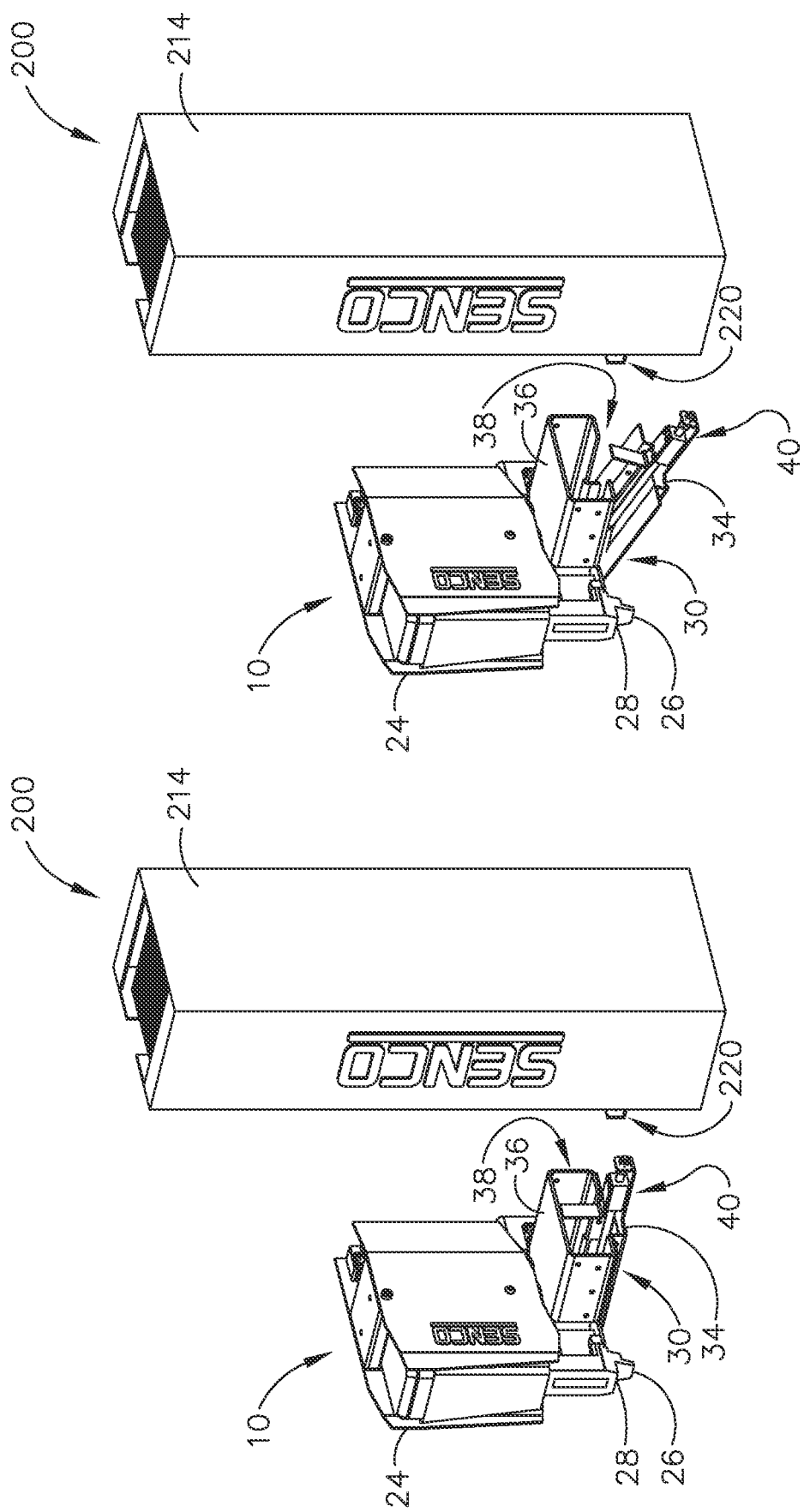

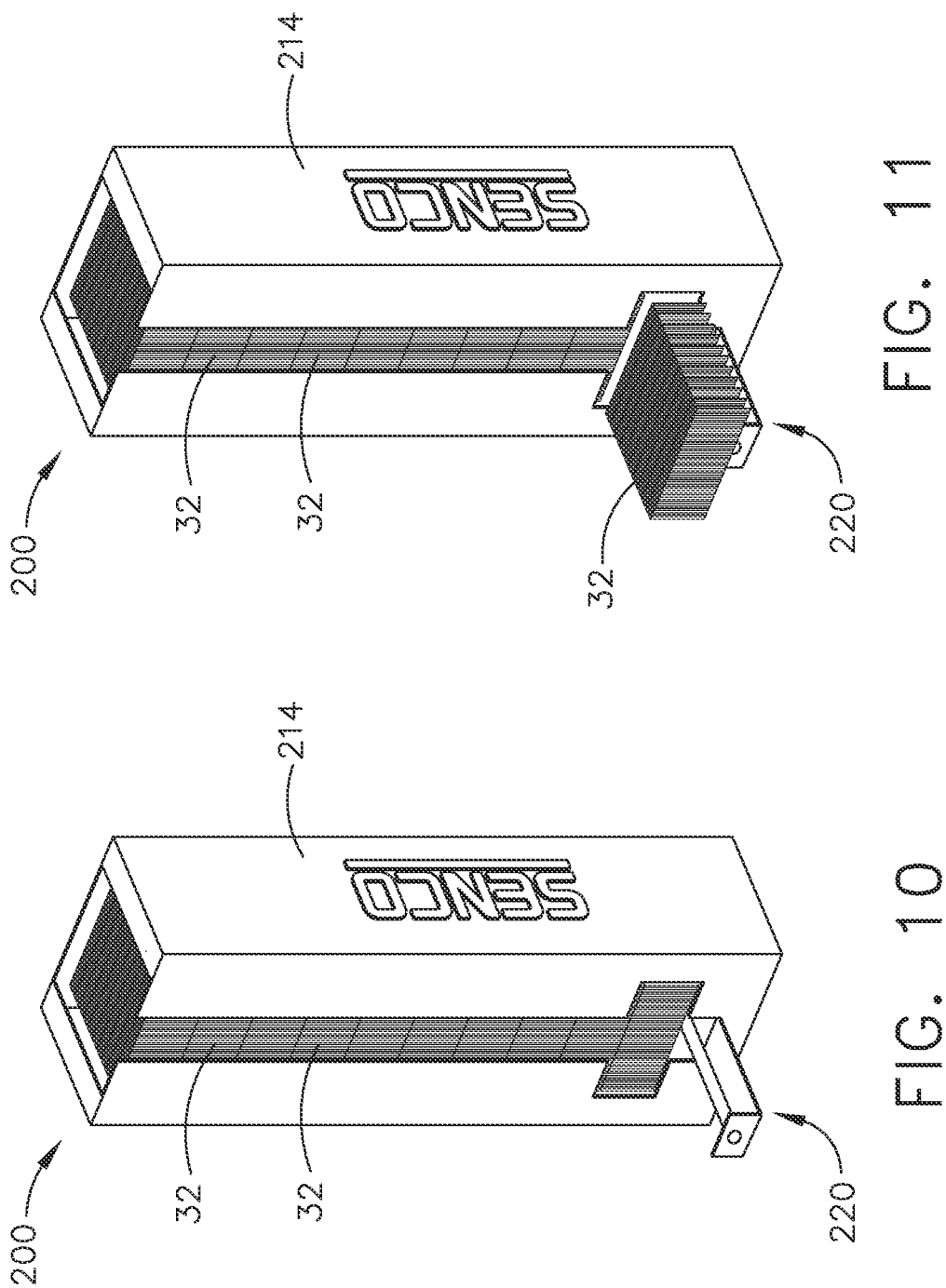

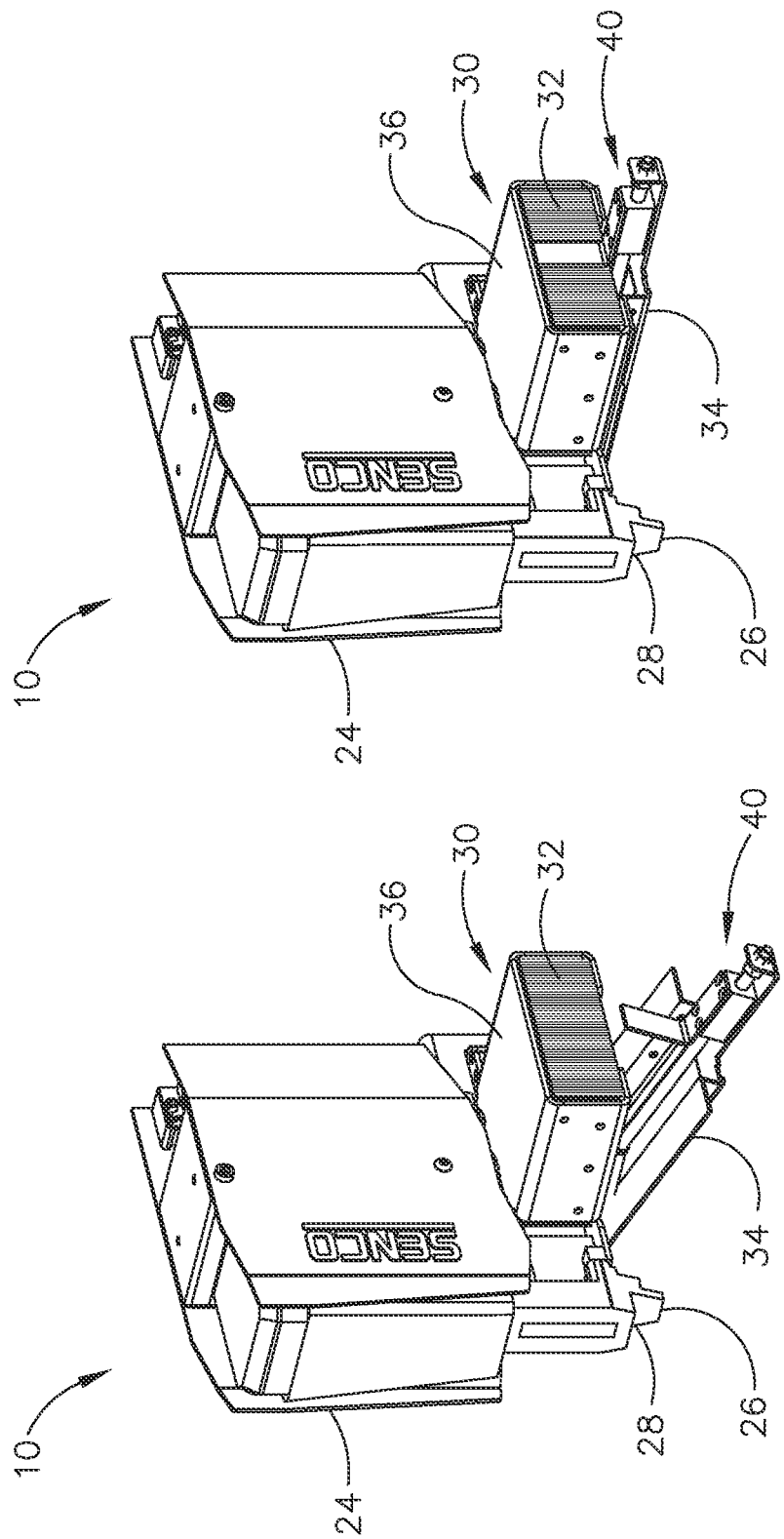

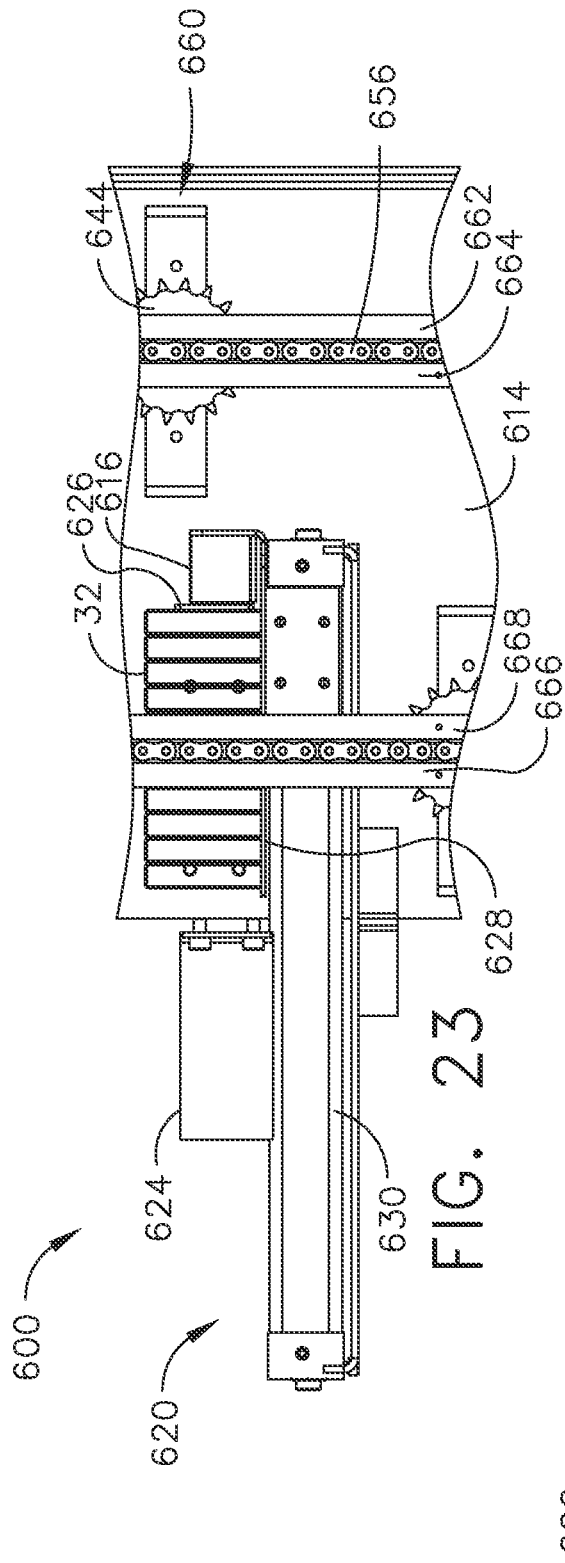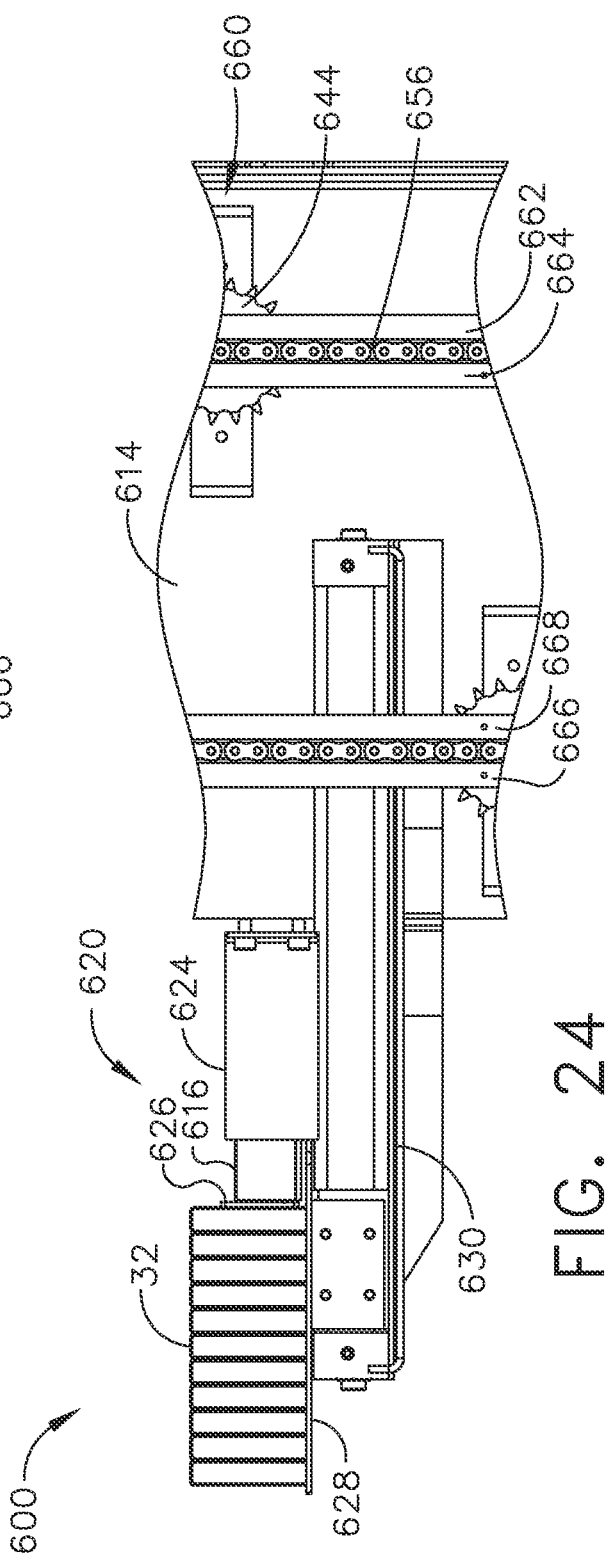

AUTOMATIC STAPLE LOADING STATION

CROSS-REFERENCE TO RELATED APPLICATIONS

The present application claims priority to provisional patent application Ser. No. 63/406,177, titled "AUTOMATIC STAPLE LOADING STATION," filed on Sep. 13, 2022.

TECHNICAL FIELD

The technology disclosed herein relates generally to fastener driving tools and is particularly directed to an automatic fastener driving tool with an automatic side-loading magazine that is capable of automatic loading via an automatic fastener loading station. Embodiments are specifically disclosed as an automatic fastener loading station that is mounted proximal to an assembly line that includes a robotically-controlled automatic fastener driving tool, in which the robot moves the fastener driving tool proximal to the automatic fastener loading station which then can load fasteners into the automatic side-loading magazine of the automatic fastener driving tool.

STATEMENT REGARDING FEDERALLY SPONSORED RESEARCH OR DEVELOPMENT

None.

BACKGROUND

Robotically-operated automatic fastener driving tools are used to improve efficiency on assembly lines. These tools are typically pneumatically powered, and include magazines that contain several hundred fasteners. However, when the tool's magazine is emptied through normal operations, typically a human user must reload the magazine with a fresh load of fasteners before the tool can continue normal operations. Some conventional magazines may be reloaded with several cartridges of fasteners before the magazine is full.

Magazine load stations typically hold individual fastener cartridges, each consisting of multiple fasteners that are stacked near the assembly line for easy access by a human user. The fastener cartridges may even be stored in packaging material at the production facility. The human user typically needs to manually open and collate the fastener cartridges before loading them into the tool's magazine.

SUMMARY

Accordingly, it is an advantage to provide an automatic fastener driving tool that includes connections to a robotic workstation and to a high speed communications network (such as the Internet®), as well as having sensors that can measure the length of a strip of fasteners loaded in the accompanying magazine, and the sensors can also determine if there is at least one strip of fasteners left in the magazine, and if the tool has fired a fastener.

It is another advantage to provide an automatic side-loading magazine for a robotically-controlled fastener driving tool that includes a clamp sub-assembly ("S/A") which holds fasteners in place inside the magazine, in which these fasteners can exhibit varying lengths, and the magazine is operable to be automatically loaded via a high-capacity loading station.

It is yet another advantage to provide a high-capacity automatic fastener loading station that can store and dispense several thousand fasteners during normal operations, in which a human user only needs to initially load the station, and the fasteners will be automatically re-positioned to exit and then dispensed to a robotically-controlled fastener driving tool until the loading station is emptied.

It is still another advantage to provide an automatic side-loading magazine for a robotically-controlled fastener driving tool that includes a clamp sub-assembly which pushes a cartridge containing a plurality of fastener strips to one side of the magazine.

It is a further advantage to provide an automatic side-loading magazine for a robotically-controlled fastener driving tool that includes a clamp sub-assembly which pushes a cartridge containing a plurality of fastener strips up for the operational strip.

It is a yet further advantage to provide an automatic loading station having a chain drive which sequentially moves a plurality of carriers holding fasteners, so that each carrier can automatically dispense its fasteners for loading into a magazine for a robotically-controlled fastener driving tool.

It is a still further advantage to provide an automatic loading station having a chain drive which sequentially moves a plurality of carriers holding fasteners, in which the chain drive includes two separate chains, and each chain holds a single carrier, and each chain is mechanically operable to rotate such that each pair of single carriers are substantially level with each other so that each pair of single carriers is operable to hold a plurality of fasteners.

It is another advantage to provide an automatic loading station having at least one chain drive which sequentially moves a plurality of carriers holding fasteners, in which the chain drive includes at least one sun gear and at least one planet gear such that the plurality of carriers is operable to move parallel (level) to each other as each carrier moves around the at least one sun gear and its corresponding ring gear.

It is still another advantage to provide an automatic loading station having a loading arm, in which the loading arm includes a double telescopic portion that exhibits two separate ultrathin slide portions, so that the loading arm is able to extend far enough to push a cartridge of fasteners into the magazine of an automatic fastener driving tool.

It is yet another advantage to provide an automatic fastener driving tool with a side-loading magazine, in which the magazine includes a door that can open to receive a cartridge of fasteners, and then close the door so that the tool may be operated in any direction in a three-dimensional working environment while the cartridge of fasteners sits securely inside the magazine.

Additional advantages and other novel features will be set forth in part in the description that follows and in part will become apparent to those skilled in the art upon examination of the following or may be learned with the practice of the technology disclosed herein.

To achieve the foregoing and other advantages, and in accordance with one aspect, an automatic fastener loader machine is provided, which comprises: an outer housing that includes an inlet loading portion, a main holding portion, and a dispensing outlet portion; the inlet loading portion comprises a first opening that is sized and shaped to receive at least one cartridge, the at least one cartridge containing a plurality of fasteners; the main holding portion is sized and shaped to contain a plurality of the at least one cartridge; and the dispensing outlet portion comprises a second opening that is sized and shaped to dispense the at least one cartridge; wherein: (a) the outer housing at least partially encloses a plurality of movable shelves that each are sized and shaped to hold the at least one cartridge; (b) the plurality of movable shelves are connected to a drive system that moves the movable shelves from the inlet loading portion to the dispensing outlet portion, while having the ability to carry the at least one cartridge; and (c) as one of the plurality of movable shelves reaches the dispensing outlet portion, the drive system allows the at least one cartridge to be moved through the second opening, and thereby unloaded from the automatic fastener loader.

In accordance with another aspect, an automatic magazine for a fastener driving tool is provided, the automatic magazine comprises: a cover portion including a pivotable door; a receiving portion that receives a cartridge through the pivotable door in an open position; an exit portion that includes an exit opening proximal to a guide body of a fastener driving tool; and a clamp mounted on the pivotable door, wherein the clamp biases the cartridge toward one side of the magazine that is proximal to the exit opening; wherein: the cartridge comprises a plurality of fastener strips arranged next to each other, in which the fasteners face in a downward direction; the cartridge exhibits a lead strip of fasteners that is positioned so as to be loaded next into the guide body; and the lead strip of fasteners is biased upward so as to be directed at the exit opening, regardless of the length of the fasteners in that lead strip; and the pivotable door is controlled by an actuator and remains closed except if a cartridge is being loaded into the receiving portion.

In accordance with a further aspect, a magazine for use with a fastener driving tool is provided, the magazine comprising: a cover portion including a pivotable door; a receiving portion that receives a cartridge through the pivotable door in an open position; an exit portion that includes an exit opening proximal to a guide body of a fastener driving tool; and a clamp mounted on the pivotable door, wherein the clamp includes a plurality of removably attachable plates that support the cartridge; wherein: the cartridge comprises a plurality of fastener strips arranged next to each other, in which the fasteners face in a downward direction; the cartridge exhibits a lead strip of fasteners that is positioned so as to be loaded next into the guide body; and the lead strip of fasteners is biased upward so as to be directed at the exit opening, regardless of the length of the fasteners in that lead strip.

In accordance with a yet further aspect, an automatic fastener loader is provided, which comprises: an outer housing that includes an inlet loading portion, a main holding portion, and a dispensing outlet portion; the inlet loading portion comprises a first opening that is sized and shaped to receive at least one cartridge, the at least one cartridge containing a plurality of fasteners; the main holding portion is sized and shaped to contain a plurality of the at least one cartridge; the dispensing outlet portion comprises a second opening that is sized and shaped to dispense the at least one cartridge; a motor that is in mechanical communication with at least one chain drive, in which the at least one chain drive includes a continuous chain; and a first plurality of movable carriers, and a second, opposite plurality of movable carriers, such that the first and second plurality of movable carriers are positioned so as to not be in contact with each other, and to exhibit an open space therebetween; the first and second plurality of movable carriers are connected in pairs to the continuous chain of the at least one chain drive such that each one of the first plurality of movable carriers faces each one of the second plurality of movable carriers, and the chain drive moves the pairs of movable carriers from the inlet loading portion to the dispensing outlet portion, while each of the pairs of movable carriers is operable to carry the at least one cartridge; and as one of the pairs of movable carriers reaches the dispensing outlet portion, the chain drive allows the at least one cartridge to be moved through the second opening, and thereby unloaded from the automatic fastener loader; wherein: the outer housing at least partially encloses the first and second plurality of movable carriers, and the at least one chain drive.

In accordance with a still further aspect, a method for dispensing fasteners from an automatic loading station is provided, the method comprising: (a) providing an automatic loading station comprising: (i) an outer housing that includes an inlet loading portion, a main holding portion, and a dispensing outlet portion; the inlet loading portion comprises a first opening that is sized and shaped to receive at least one cartridge, the at least one cartridge containing a plurality of fasteners; the main holding portion is sized and shaped to contain a plurality of the at least one cartridge; the dispensing outlet portion comprises a second opening that is sized and shaped to dispense the at least one cartridge; (ii) a motor that is in mechanical communication with at least one chain drive; (iii) a first plurality of movable carriers, and a second, opposite plurality of movable carriers at least partially enclosed by the outer housing; the first and second plurality of movable carriers are not in contact with each other, and exhibit an open space therebetween; the first and second plurality of movable carriers are connected to the at least one chain drive in pairs such that each one of the first plurality of movable carriers faces each one of the second plurality of movable carriers, and each pair is operable to carry the at least one cartridge; (b) moving the pairs of movable carriers, using the chain drive, from the inlet loading portion to the dispensing outlet portion; (c) loading the at least one cartridge onto a loading arm from one of the pairs of movable carriers; (d) providing an automatic magazine for use with a fastener driving tool, the magazine comprising: (i) a cover portion including a pivotable door; (ii) a receiving portion that receives the at least one cartridge through the pivotable door in an open position; (iii) an exit portion that includes an exit opening proximal to a guide body of a fastener driving tool; and (iv) a clamp mounted on the pivotable door, wherein the clamp includes a plurality of removably attachable plates that support the at least one cartridge; (e) opening the pivotable door of the magazine; (f) extending the loading arm from the dispensing outlet portion of the loading station towards the magazine; (g) loading the at least one cartridge into the magazine from the automatic loading station; (h) retracting the loading arm away from the magazine to the arm's original position; (i) closing the pivotable door of the magazine.

Still other advantages will become apparent to those skilled in this art from the following description and drawings wherein there is described and shown a preferred embodiment in one of the best modes contemplated for carrying out the technology. As will be realized, the technology disclosed herein is capable of other different embodiments, and its several details are capable of modification in various, obvious aspects all without departing from its principles. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the technology disclosed herein, and together with the description and claims serve to explain the principles of the technology. In the drawings:

FIG. 6 is a perspective view showing a first stage of a fastener loading sequence between the tool and the magazine of FIG. 1, and the loading station of FIG. 5.

FIG. 7 is a perspective view showing a second stage of the fastener loading sequence of FIG. 6.

FIG. 10 is a perspective view showing a fifth stage of the fastener loading sequence of FIG. 6.

FIG. 11 is a perspective view showing a sixth stage of the fastener loading sequence of FIG. 6.

FIG. 12 is a perspective view showing a seventh stage of the fastener loading sequence of FIG. 6.

FIG. 13 is a perspective view showing an eighth stage of the fastener loading sequence of FIG. 7.

FIG. 23 is an enlarged view of the loading station of FIG. 18, showing a cartridge magazine loaded onto the pusher.

FIG. 24 is an enlarged view of the loading station of FIG. 18, showing a cartridge magazine extended outwards on the pusher away from the loading station.

DETAILED DESCRIPTION

Figure 1:
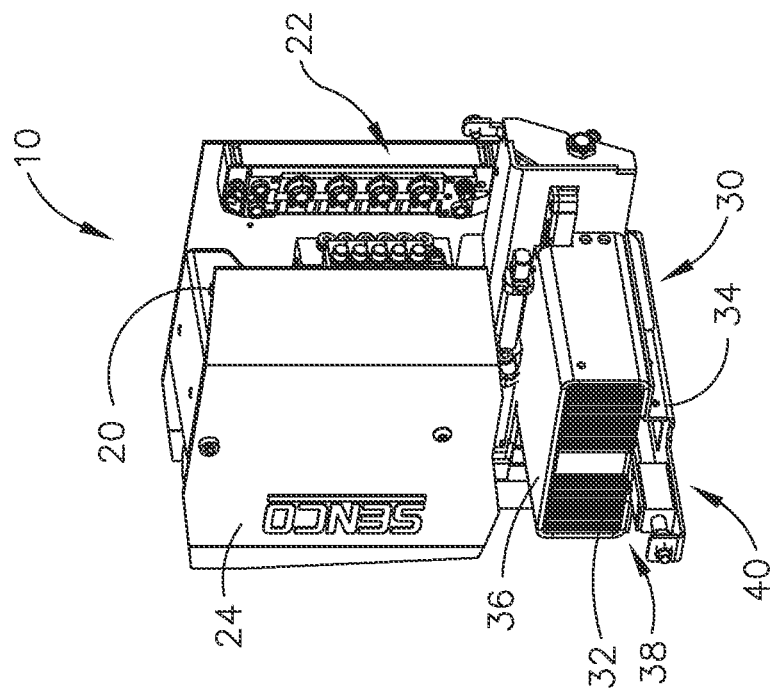
FIG. 1 is a front left perspective view of an automatic fastener driving tool with an automatic side-loading magazine, as constructed according to the principles of the technology disclosed herein.

Reference will now be made in detail to the present preferred embodiment, an example of which is illustrated in the accompanying drawings, wherein like numerals indicate the same elements throughout the views.

It is to be understood that the technology disclosed herein is not limited in its application to the details of construction and the arrangement of components set forth in the following description or illustrated in the drawings. The technology disclosed herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," or "mounted," and variations thereof herein are used broadly and encompass direct and indirect connections, couplings, or mountings. In addition, the terms "connected" or "coupled" and variations thereof are not restricted to physical or mechanical connections or couplings. Furthermore, the terms "communicating with" or "in communications with" refer to two different physical or virtual elements that somehow pass signals or information between each other, whether that transfer of signals or information is direct or whether there are additional physical or virtual elements therebetween that are also involved in that passing of signals or information. Moreover, the term "in communication with" can also refer to a mechanical, hydraulic, or pneumatic system in which one end (a "first end") of the "communication" may be the "cause" of a certain impetus to occur (such as a mechanical movement, or a hydraulic or pneumatic change of state) and the other end (a "second end") of the "communication" may receive the "effect" of that movement/change of state, whether there are intermediate components between the "first end" and the "second end," or not. If a product has moving parts that rely on magnetic fields, or somehow detects a change in a magnetic field, or if data is passed from one electronic device to another by use of a magnetic field, then one could refer to those situations as items that are "in magnetic communication with" each other, in which one end of the "communication" may induce a magnetic field, and the other end may receive that magnetic field, and be acted on (or otherwise affected) by that magnetic field.

The terms "first" or "second" preceding an element name, e.g., first inlet, second inlet, etc., are used for identification purposes to distinguish between similar or related elements, results or concepts, and are not intended to necessarily imply order, nor are the terms "first" or "second" intended to preclude the inclusion of additional similar or related elements, results or concepts, unless otherwise indicated.

In addition, it should be understood that embodiments disclosed herein include both hardware and electronic components or modules that, for purposes of discussion, may be illustrated and described as if the majority of the components were implemented solely in hardware.

It will be understood that the term "circuit" as used herein can represent an actual electronic circuit, such as an integrated circuit chip (or a portion thereof), or it can represent a function that is performed by a processing circuit, such as a microprocessor or an ASIC that includes a logic state machine or another form of processing element (including a sequential processing circuit). A specific type of circuit could be an analog circuit or a digital circuit of some type, although such a circuit possibly could be implemented in software by a logic state machine or a sequential processor. In other words, if a processing circuit is used to perform a desired function used in the technology disclosed herein (such as a demodulation function), then there might not be a specific "circuit" that could be called a "demodulation circuit;" however, there would be a demodulation "function" that is performed by the software. All of these possibilities are contemplated by the inventors, and are within the principles of the technology when discussing a "circuit."

Referring now to FIG. 1, an automatic fastener driving tool, generally designated by the reference numeral 10, includes an automatic side-loading magazine 30. The tool 10 exhibits an external gas connection 20, an integrated controller connection portion 22, a housing 24, a guide body 28, and a fastener exit end 26. Preferably, the tool is pneumatic, although an electrically-powered tool is contemplated. An example tool is the SKSXP, a tool sold by Kyocera Senco Industrial Tools, Inc. and sold by Kyocera Senco Europe.

The magazine 30 is mounted to the tool 10, and includes a door 34, a cover portion 36, a flexible or spring-loaded clamp S/A 40, and holds a plurality of fasteners 32 (such as staples). Preferably, the fasteners 32 are collated into strips, in which several strips containing several hundred fasteners at a time are collated as a type of "cartridge." These fastener strips are arranged next to each other and face in a downward direction (i.e., the same direction as the fastener exit end 26). The magazine 30 is able to hold a variety of fastener lengths, and the clamp S/A 40 keeps the fasteners pressed in place against one side of the magazine.

The magazine 30 exhibits a receiving portion 38 where the cartridges 32 are loaded through the pivotable door 34, which must be in an open position. The magazine 30 also exhibits an exit portion with an exit opening proximal to the guide body 28. The cartridge 32 exhibits a lead strip of fasteners that the clamp S/A 40 positions so as to be loaded next into the guide body 28, and the clamp S/A 40 also biases the lead strip upwards so as to be directed at the exit opening.

Figure 2:
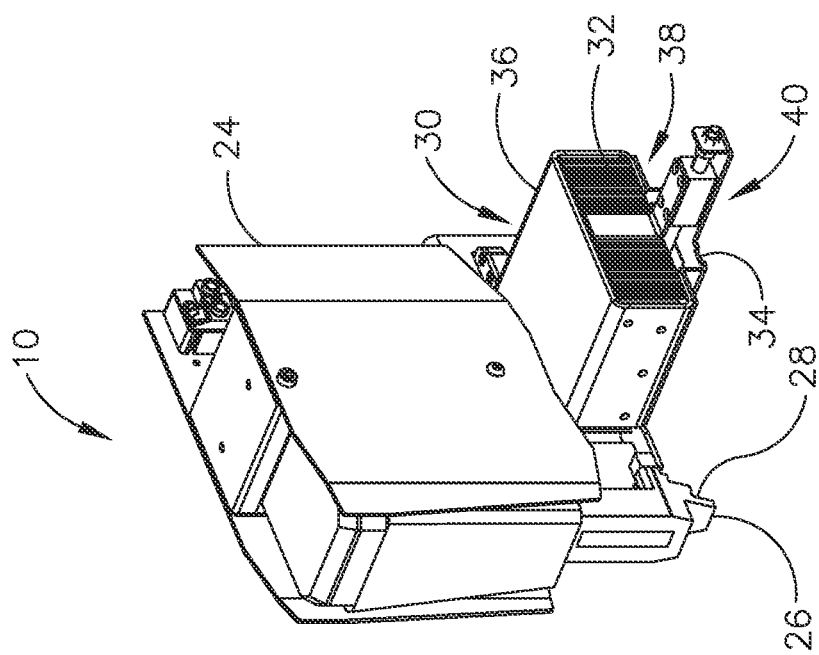
FIG. 2 is a rear left perspective view of the tool and the magazine of FIG. 1.

Referring now to FIG. 2, the external pressurized gas connection 20 and the integrated controller connection portion 22 are depicted. An external pressurized gas source is connected to the external gas connection 20 which then powers the tool 10 during operation. The integrated controller connection portion 22 is operatively connected to a robotically-controlled workstation 300 (see FIGS. 14-15), and the tool 10 is controlled through the workstation 300 via the integrated controller connection portion 22.

The tool 10 also contains a contactless sensor (proximity or other distance-measuring sensor) and a linear measurement sensor. The contactless sensor determines the magazine containing at least one collated strip of fasteners loaded in the magazine 30, whereas the linear measurement sensor determines whether or not there is at least one fastener 32 left in the magazine 30, and the linear measurement sensor can determine if the tool 10 has fired a fastener 32. Both sensors are controlled by a "Field Logic Controller" or "FLC" located on the tool 10. Preferably, the FLC is connectable to the high-speed communications network, such as the Internet® or an internal intranet.

Figure 3:
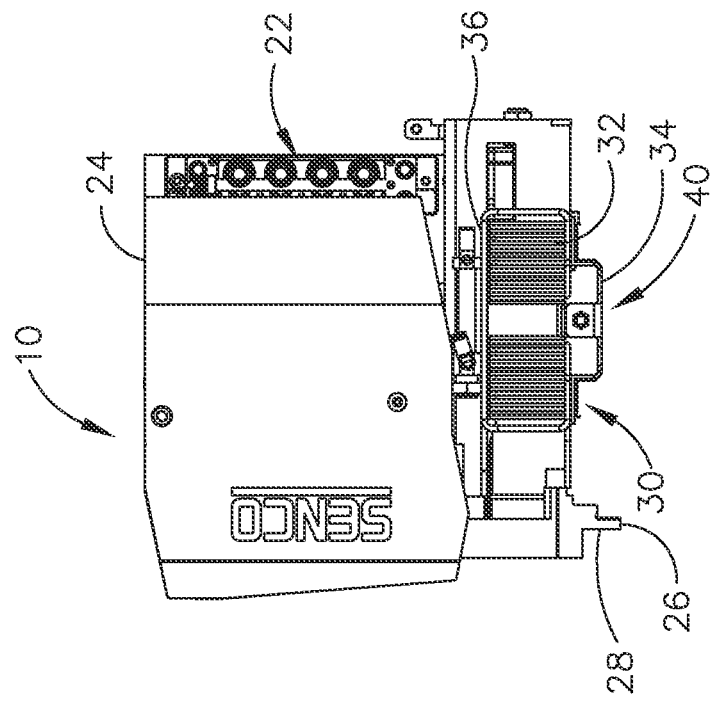
FIG. 3 is a left side elevation view of the tool and the magazine of FIG. 1.

Referring now to FIG. 3, in this illustrated embodiment the housing 24 does not cover the magazine 30. The housing 24 primarily covers the inner mechanisms of the tool 10.

Figure 4:
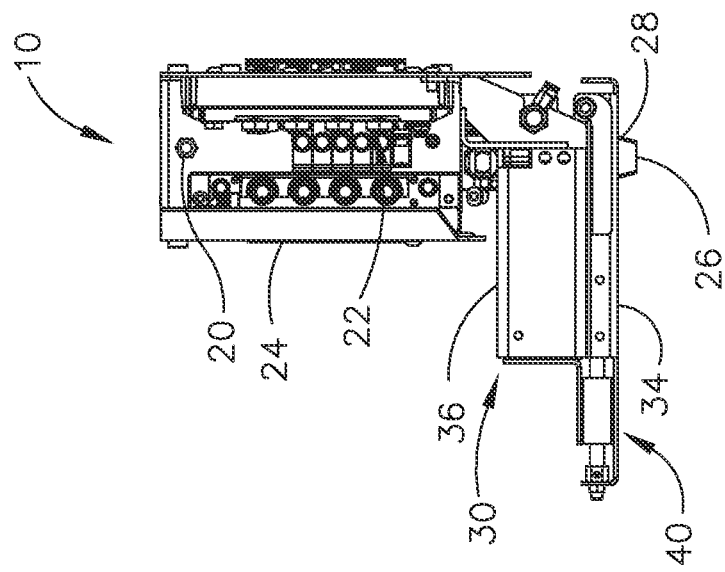
FIG. 4 is a rear elevation view of the tool and the magazine of FIG. 1.

Referring now to FIG. 4, the external gas connection 20 and the integrated controller connection portion 22 are only partially covered by the housing 24, in this illustrated embodiment. The magazine 30 is mounted in a manner to load at least one strip of fasteners in a direction that is perpendicular to the driving direction of the tool 10.

Figure 5:
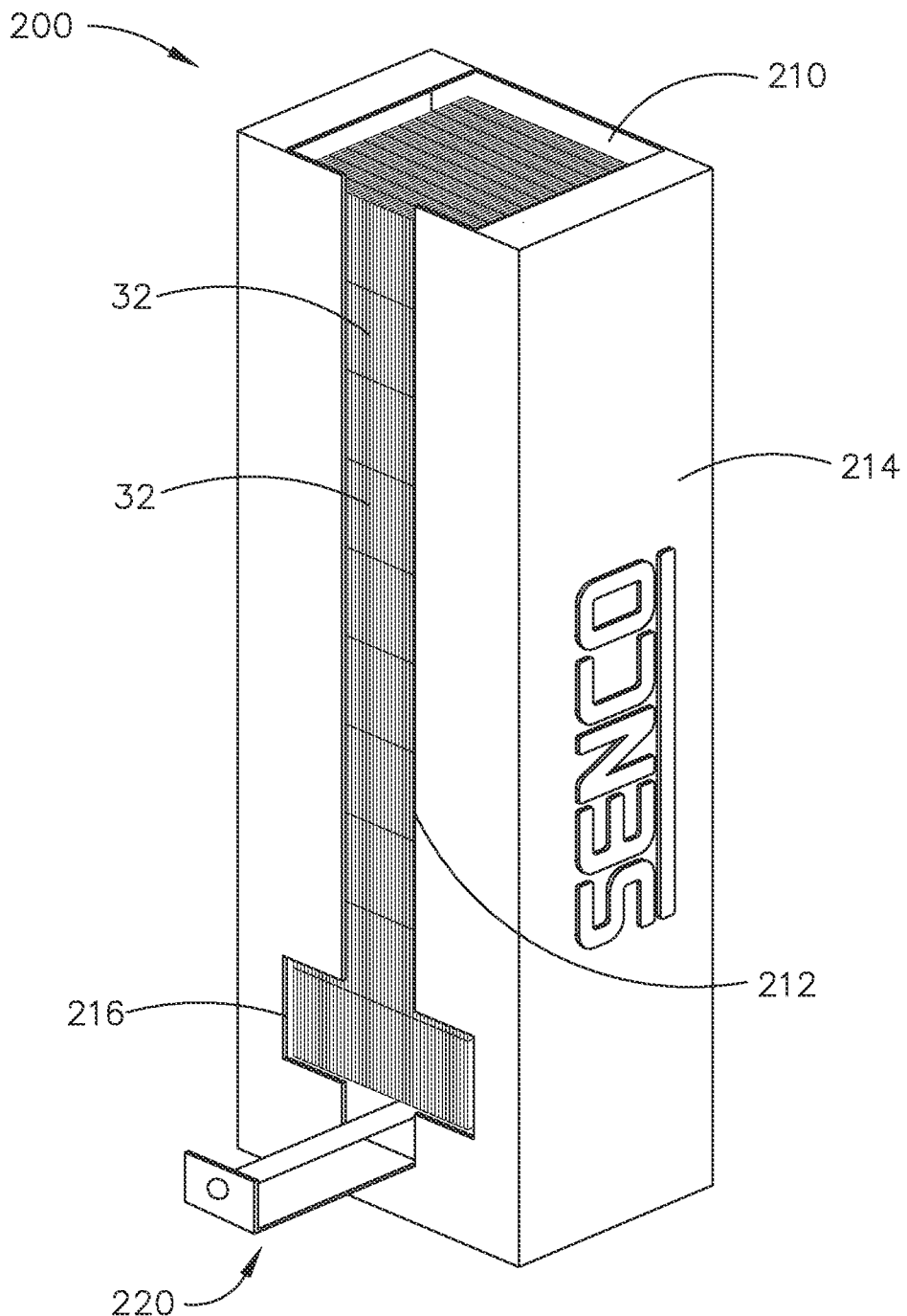
FIG. 5 is a front left perspective view of a high-capacity automatic fastener loading station, as constructed according to the principles of technology disclosed herein.

Referring now to FIG. 5, a high-capacity automatic fastener loading station (or "loader"), generally designated by the reference numeral 200, is illustrated which includes an outer housing 214, a vertical opening 212 in the outer housing, a (refill) inlet loading portion 210 (having a top opening of the housing), and a guide 220 at a dispensing outlet portion 216 of the housing (i.e., this is the exit of the loader 200). The inlet loading portion 210 comprises a first opening that is sized and shaped to receive at least one cartridge that contains a plurality of fasteners. The dispensing outlet portion 216 comprises a second opening that is sized and shaped to dispense at least one cartridge that contains a plurality of fasteners.

The loading station 200 is able to hold several sets of fastener cartridges 32 (with each cartridge containing several hundred fasteners, organized in multiple individual elongated strips of fasteners), and is also able to automatically dispense them into the magazine 30 of the tool 10, as discussed below in greater detail. The loading station 200 is relatively tall in the illustrated embodiment, and most of its height consists of its 'main holding portion' that is designed to contain many layers of cartridges of fasteners between its upper inlet loading portion 210 and its lower dispensing outlet portion 216, where the fasteners exit the loading station.

In a typical manufacturing operation, a human user would manually load fastener cartridges 32 into the station 200 via the inlet refill portion 210. These cartridges 32 are temporarily stored in the station 200 until dispensed to the tool's magazine 30. The station 200 includes a chain drive with movable shelves driven by planetary gear sets that automatically move the cartridges 32 from the top of the opening in the housing 212 towards the bottom, and then exit the station via the guide at the dispensing outlet portion 216 of the loader 200 (and into the tool's magazine 30). Preferably, the planetary gear sets have a 1.5:1 ratio in this illustrated embodiment.

A brief overview of the structure and operation of the automatic fastener loader 200 follows: the outer housing at least partially encloses a plurality of movable shelves that each are sized and shaped to hold at least one of the cartridges that contains a plurality of fasteners. The plurality of movable shelves are connected to a drive system that moves the movable shelves from the inlet loading portion to the dispensing outlet portion, while having the ability to carry the at least one of the cartridges that contains a plurality of fasteners. As one of the plurality of movable shelves reaches the dispensing outlet portion, the drive system allows at least one of the cartridges to be moved through the second opening, and thereby unloaded from the automatic fastener loader. The drive system of the illustrated embodiment comprises a continuous chain that is connected to the plurality of movable shelves, and moves the individual movable shelves through a rotation inside the loader from the inlet loading portion to the dispensing outlet portion, and then back to the inlet loading portion. As stated above, the drive system uses a plurality of planetary gear sets to act as a prime mover for the continuous chain.

Fastener Load Sequence

Figure 8:
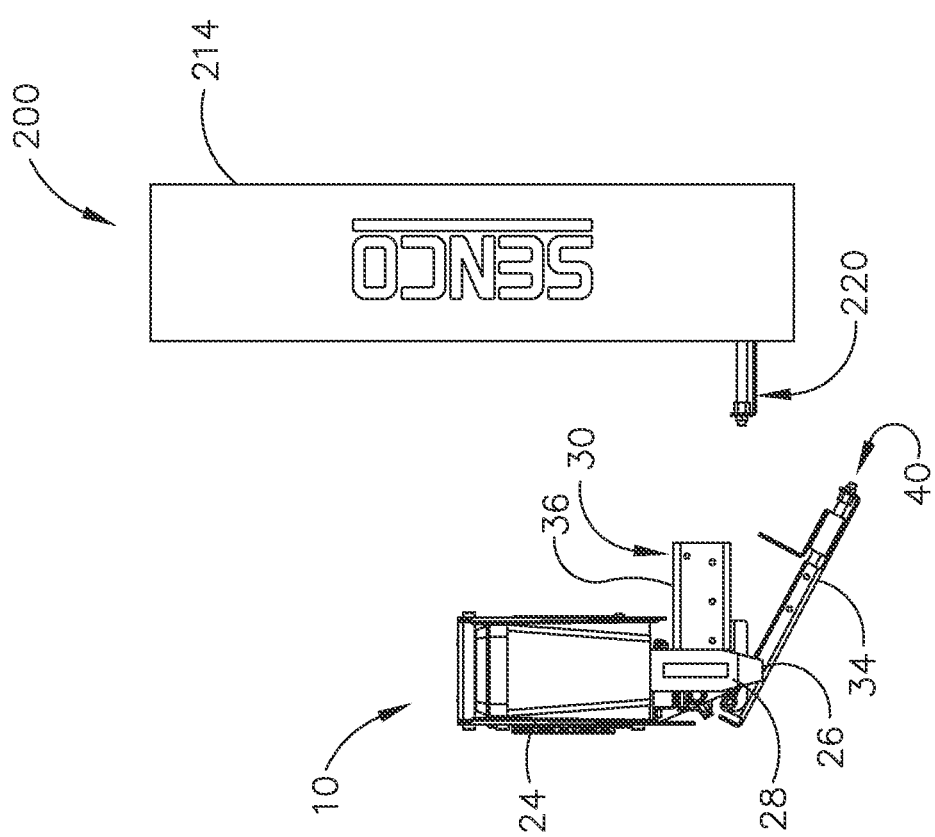
FIG. 8 is an elevation view showing a third stage of the fastener loading sequence of FIG. 6.

Referring now to FIG. 6, a first stage of a fastener load sequence is depicted. In this first stage, a robotic arm 302 (see FIG. 15) automatically moves the tool 10 to a position that is proximal to the loading station 200 (using the robotically-controlled workstation 300). Next in FIG. 7, in a second stage of this load sequence, the magazine door 34 is opened (preferably pneumatically). The magazine 30 is constructed to allow the loading station 200 a clear path to load the magazine 30. Then in FIG. 8, in a third stage of the load sequence, the tool 10 is moved into contact with the loading station 200.

Figure 9:
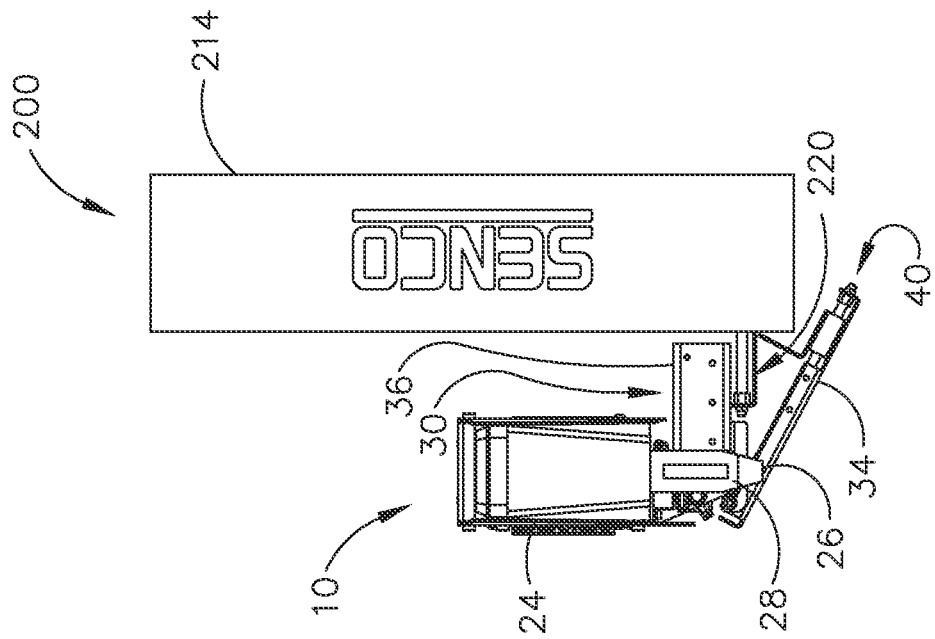
FIG. 9 is an elevation view showing a fourth stage of the fastener loading sequence of FIG. 6.

Referring now to FIG. 9, in a fourth stage of the load sequence, the tool 10 is now in contact with the loading station 200. At this stage, the guide at the exit end of the loader 220 is positioned between the open magazine 30 and the clamp S/A 40.

Referring now to FIG. 10, in a fifth stage of the load sequence, the loading station 200 automatically moves the next nested fastener cartridge 32 down (note that the tool is not shown for clarity). Next, in FIG. 11, in a sixth stage of the load sequence, the loading station 200 pushes a single fastener cartridge 32 out of the opening in the housing 212 and onto the guide at the exit end of the loader 220 (again, the tool 10 is not shown for clarity). It should be noted that the clamp S/A 40 is used to keep the fastener strips in the correct orientation, against one side of the magazine 30.

Referring now to FIG. 12, in a seventh stage of the load sequence, the tool 10 is moved out of contact with the loading station 200 (using the robotically-controlled workstation 300), and the magazine door 34 is automatically closed (preferably pneumatically). (Note that the station 200 is not shown for clarity.) In FIG. 12, the position of the tool 10 to the station 200 is similar to that depicted in FIG. 6. Last, in FIG. 13, in an eighth stage of the load sequence, the tool 10 is moved back into position to resume normal operations (again, using the robotically-controlled workstation 300).

The magazine 30 automatically loads a single fastener strip into a side-opening of the fastener driving tool, when the tool 10 is to be operated. The magazine 30 has the capability of loading each individual fastener strip, one at a time, from the cartridge of fasteners that was previously loaded into the magazine by the high-capacity loader 200. The magazine 30 also has a biased guide that pushes the fastener strip in an upwards direction as that fastener strip is being loaded into the tool 10. Therefore, various lengths of staples can be loaded into the tool using this biased guide, because the staples are pointed downwards (in the direction of the tool's driver movement) and thus different sizes (lengths) of staples can be loaded into and driven by the tool 10 without needing to change any components within the tool.

In the illustrated embodiment, each cartridge 32 comprises a plurality of staple strips that are positioned next to one another. In the illustrated orientation of the staple strips each staple is pointed downwards, or in other words the opening of the staple is down, the width of the staple is horizontal, and the length of the staple is vertical. It will be understood that fasteners other than staples can be used in this system, such as strips of nails, strips of brads, or strips of pins.

In the illustrated embodiment, the staples typically are oriented such that each of the staples comprises a width arm (i.e., an arm having a horizontal width dimension), and two legs of the same length that are attached to the ends of the arm. The legs extend vertically downward, and create a bottom opening between the legs. The staple, thus constructed and oriented, will have its two legs driven into a target substrate by the driver of the fastener driving tool.

As partially discussed above, each cartridge of staples 32 is loaded into a loading station 200, and then the intact cartridge is later loaded into the magazine 30 of the fastener driving tool 10. Once inside the magazine 30, each individual staple strip is loaded into the guide body at a side entrance so that each individual staple of that strip can be driven into a target workpiece. Once the final staple of an individual staple strip has been driven, the magazine 30 has the ability to automatically push the next staple strip into the operational position so that these individual staples of this this strip can then be driven by the tool 10.

Figure 14:
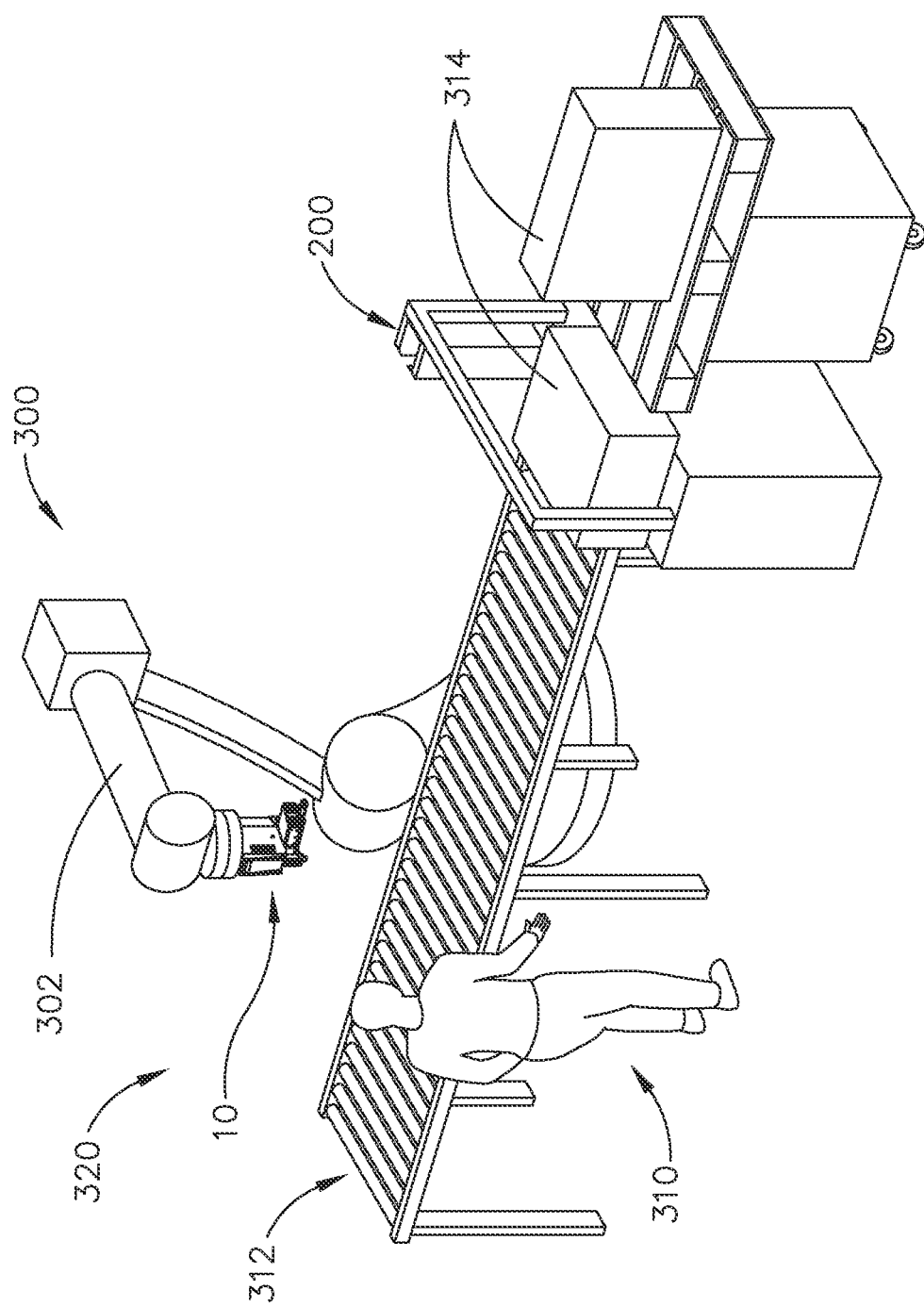
FIG. 14 is a right side perspective view showing an example of the tool and the magazine of FIG. 1 mounted on a robotically-controlled station, the loading station of FIG. 5, and a human user working on an assembly line.
Figure 15:
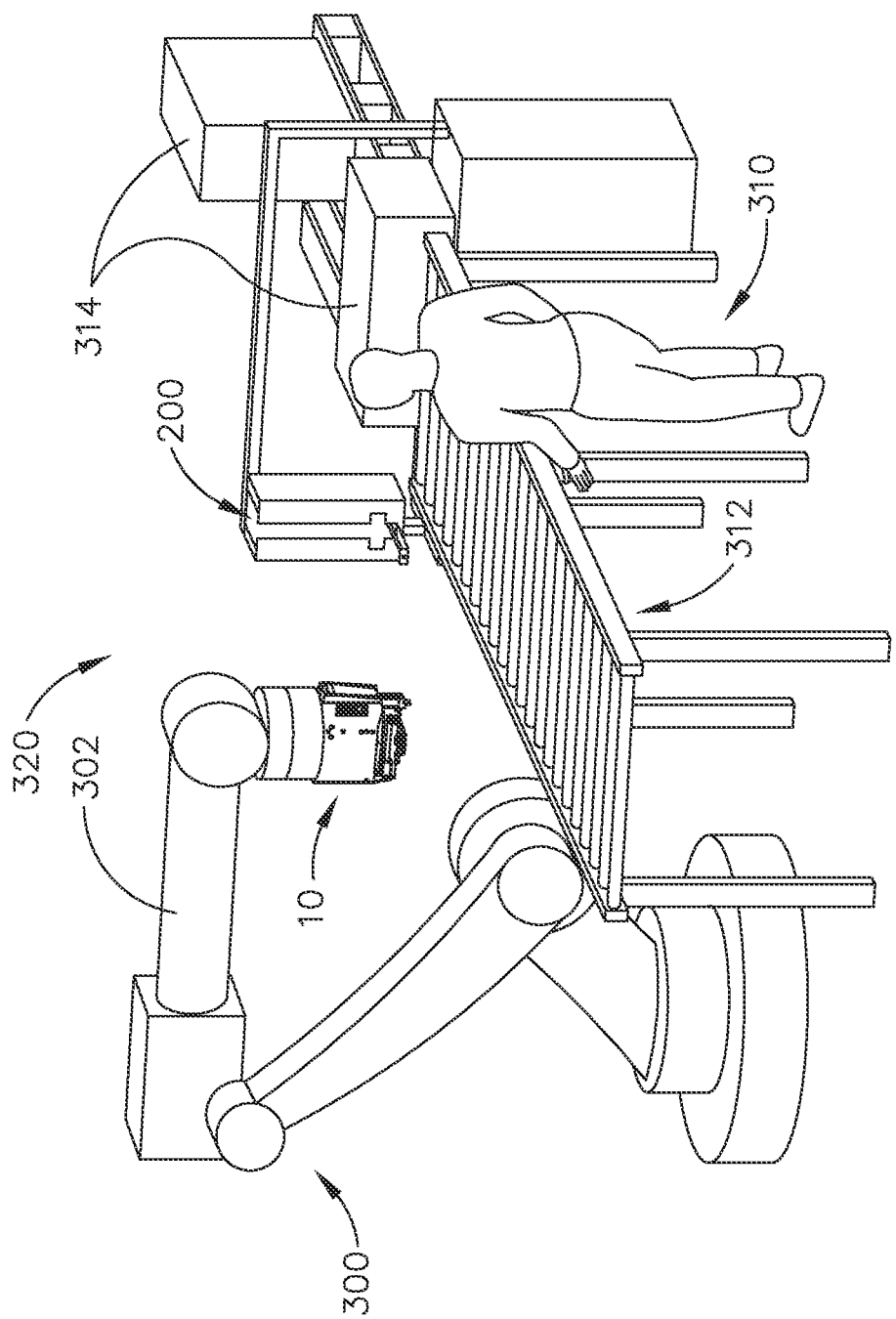
FIG. 15 is a left side perspective view of FIG. 14.

Referring now to FIGS. 14 and 15, an example assembly line 320 is depicted. The example assembly line 320 includes the robotically-controlled workstation 300 exhibiting the top arm 302, the tool 10 mounted on the workstation 300, the loading station 200, an assembly line 312, workpieces 314, and a human user 310. Note that the assembly line 312 comprises an essentially flat bed of rollers, so that parts being assembled using the fastener driving tool 10 can be readily moved along the assembly line.

Figure 17:
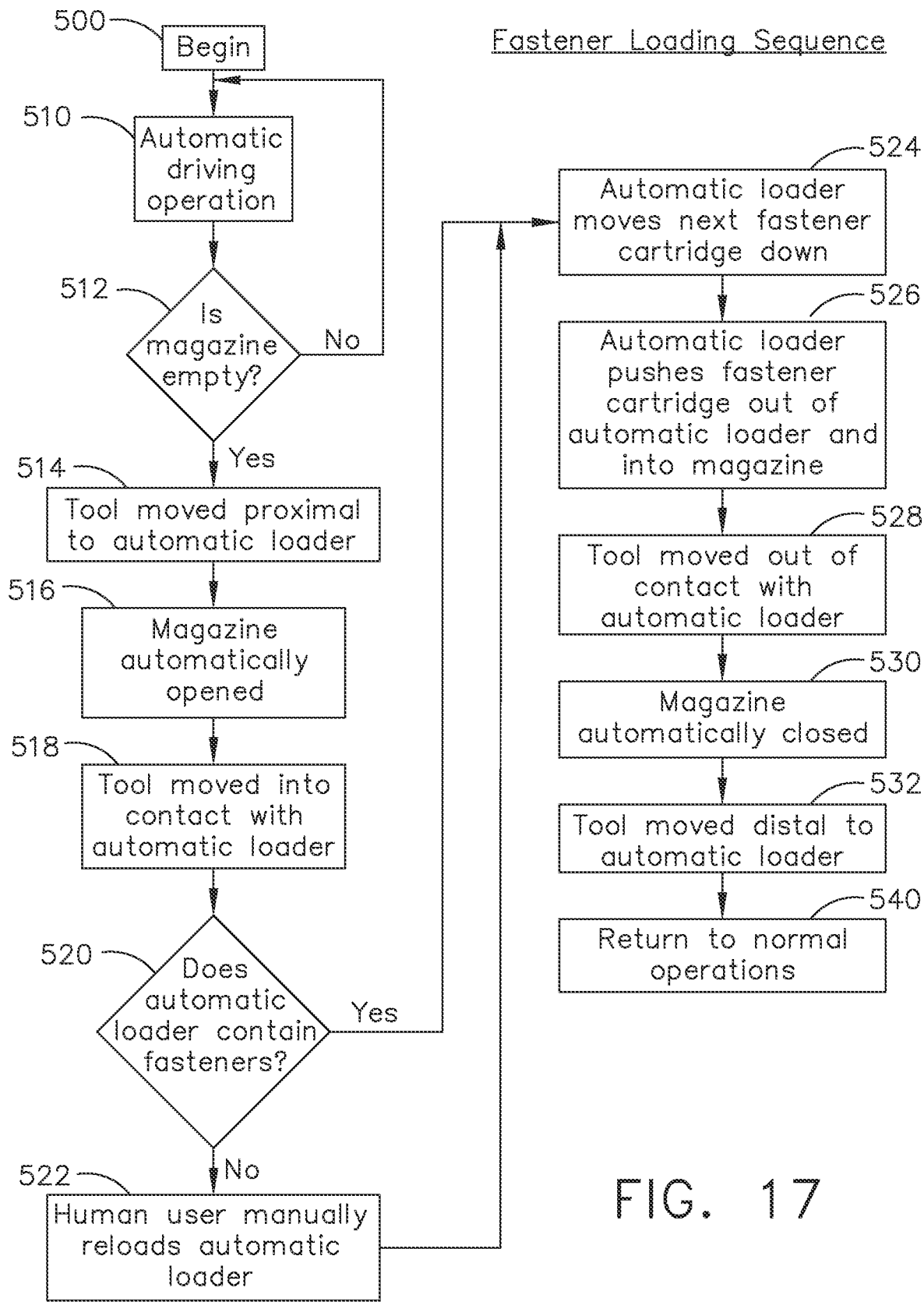
FIG. 17 is a flow chart showing certain functions performed during a "Fastener Loading Sequence," as used in the tool and the magazine of FIG. 1, and the loading station of FIG. 5.

Referring now to FIG. 17, a flow chart showing some the major functions of a "fastener loading sequence" begins at reference numeral 500. Next, at a function 510 the robotically-controlled workstation begins normal operations; i.e., the tool 10 will be in use driving fasteners into workpieces. Then, at an operational decision 512, the tool 10 checks if the magazine 30 is empty. If NO, then normal operations continue. However, if YES, then at a function 514 the tool 10 will be moved proximal to the automatic fastener loading station 200 (using the robotically-controlled workstation 300).

At a function 516, the magazine door 34 is automatically opened. Then, at a function 518, the tool 10 is moved into contact with the loading station 200 (using the robotically-controlled workstation 300). At an operational decision 520, the loading station 200 checks if the magazine 212 contains at least one fastener cartridge 32. If NO, then at a function 522, a human user must now manually reload the magazine 212 of the loading station 200.

However, at decision 520, if there is at least one fastener cartridge (i.e., the result was YES), then at a function 524 the loading station 200 automatically moves the next nested fastener cartridge 32 down. Then at a function 526, the loading station 200 pushes a single fastener cartridge 32 out and onto the guide at the exit end of the loader 220. This push movement simultaneously inserts the cartridge 32 into the magazine 30.

At a function 528 the tool 10 is moved out of contact with the loading station 200 (using the robotically-controlled workstation 300). Then at a function 530, the magazine door 34 automatically closes. Next, at a function 532, the tool 10 is moved distal to the loading station 200 (using the workstation 300) and, at a function 540 the tool 10 is repositioned at its operational position, where it returns to normal operations.

First Alternative Embodiment

Figure 16:
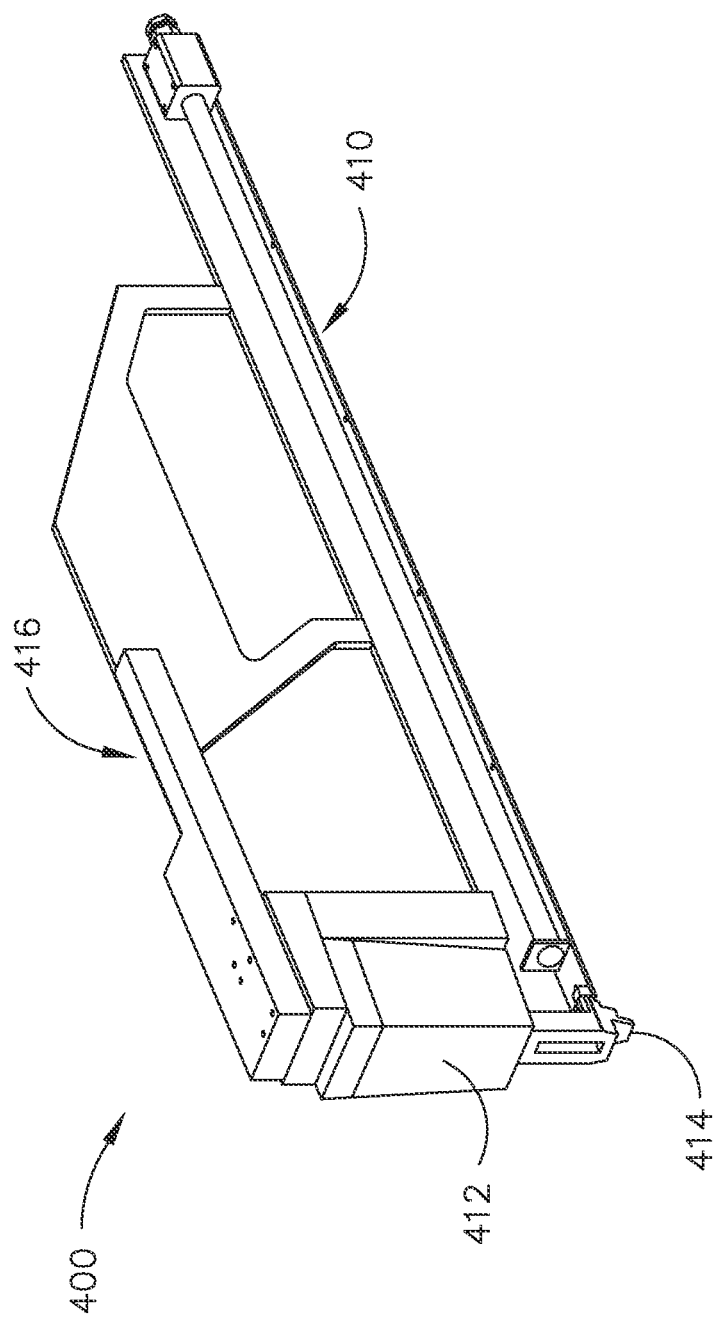
FIG. 16 is a first alternative embodiment automatic fastener driving tool having an extended magazine.

Referring now to FIG. 16, a first alternative embodiment automatic fastener driving tool is generally designated by the reference numeral 400. The tool 400 includes a housing 412, a fastener exit end 414, an extended magazine 410, and a support brace 416 for the extended magazine 410. In this embodiment, the extended magazine 410 includes a much longer guide that can hold a plurality of fastener cartridges 32, and thus fewer loading station trips would be necessary during normal operations.

Second Alternative Embodiment

Figure 18:
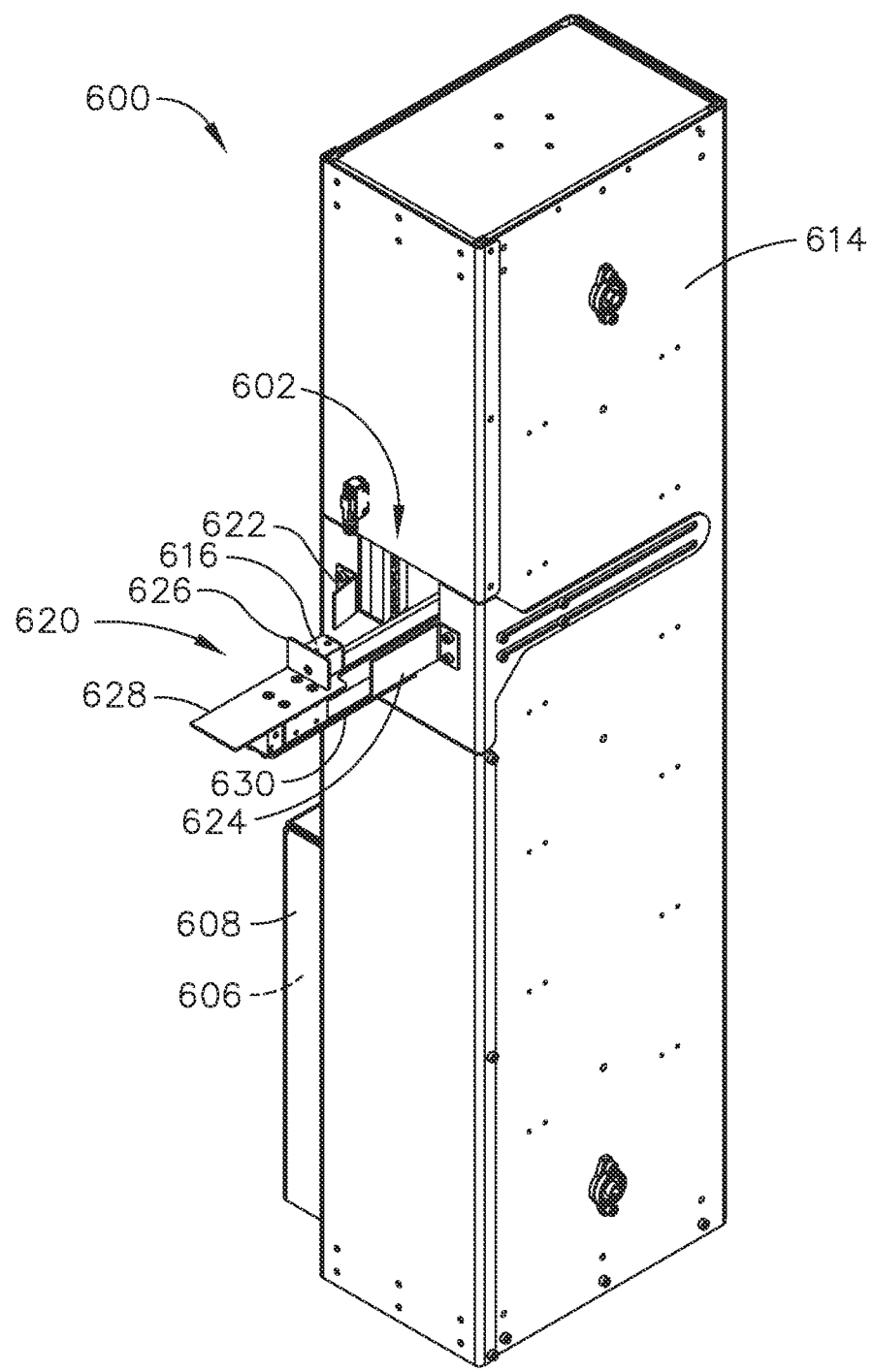
FIG. 18 is a front left perspective view of a second alternative embodiment of a high-capacity automatic fastener loading station, as constructed according to the principles of technology disclosed herein.

Referring now to FIG. 18, a second alternative embodiment loading station is generally designated by the reference numeral 600. The loading station 600 has an outer housing 614, a loading door 604 (also sometimes referred to herein as an "inlet loading portion") on one side (see FIG. 19), and a motor housing 608 with a motor 606 inside that drives the loading station. The loading station 600 includes an opening at exit end 602 (also sometimes referred to herein as a "dispensing outlet portion") opposite the loading door 604. The opening at exit end 602 is used to dispense a single fastener "cartridge" 32 at a time into the automatic fastener driving tool, whereas the loading door 604 is used to fill the loading station 600 with a plurality of fastener cartridges 32. Each cartridge holds several hundred fasteners 32, and the loading station 600 is able to hold several cartridges (i.e., the loading station can hold several thousand fasteners).

Proximal to the opening at exit end 602 is a guide subassembly ("S/A") 620 that directs and holds a cartridge 32 during a loading operation. The guide S/A 620 includes a pusher 616, a first guide 622, a second guide 624, a vertical pusher portion 626, a horizontal pusher portion 628, and a loading arm 630. When the loading station 600 is between loading cycles, the pusher 616 is retracted inside the loading station.

Then, during a loading event, a cartridge of fasteners 32 is loaded onto the pusher 616 by moving from a position above the loading arm 630 to below the loading arm 620, and 'dropping off' the cartridge 32 onto the horizontal portion 628. The pusher 616 is moved along the loading arm 630, and the vertical portion 626 pushes the cartridge 32 out through the opening at exit end 602. The first guide 622 and the second guide 624 both direct the cartridge 32 when the pusher 616 is moved.

Figure 19:
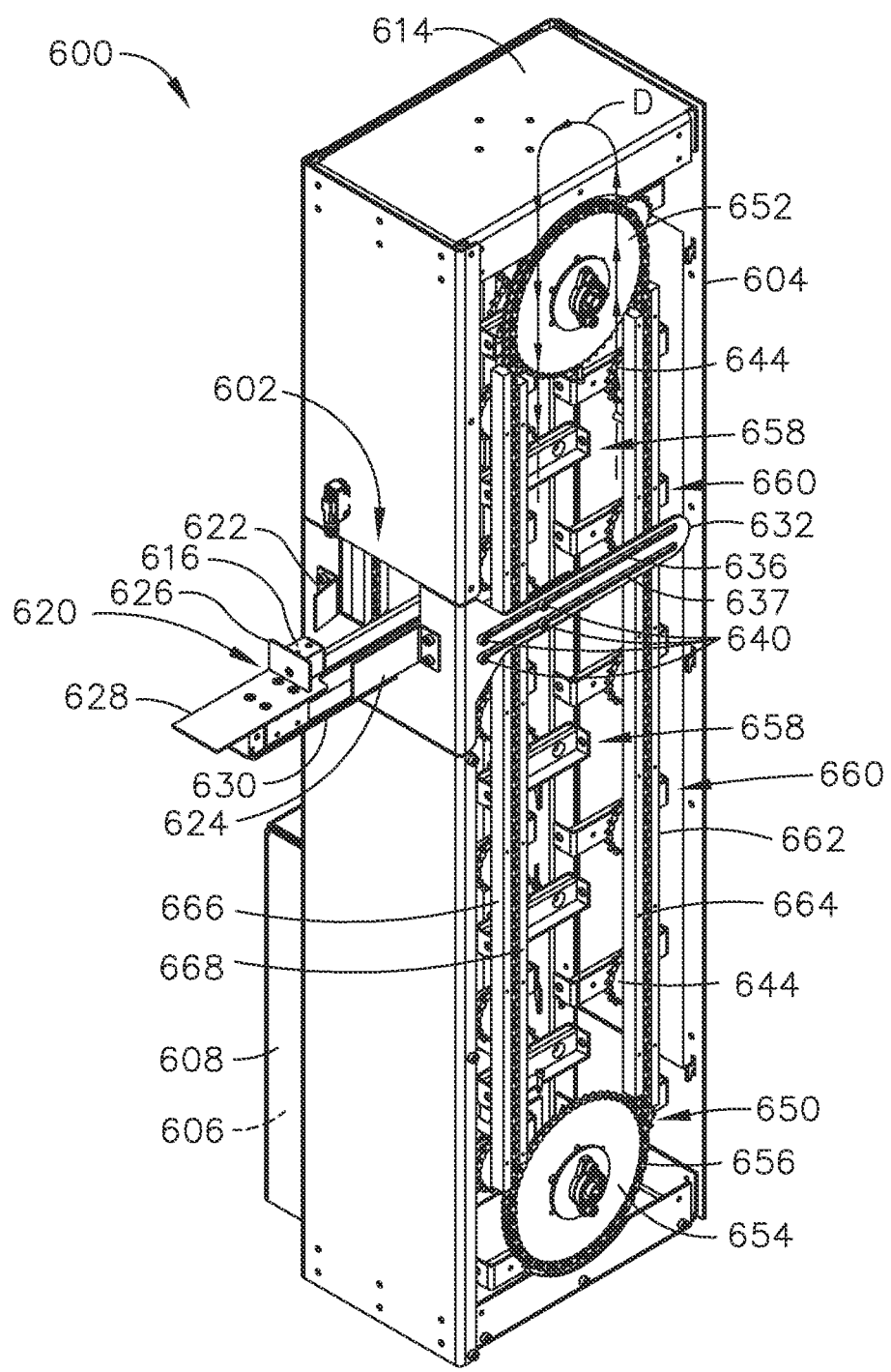
FIG. 19 is a front left perspective view of the loading station of FIG. 18, with part of the outer housing not shown.

Referring now to FIG. 19, some of the inner features of the loading station 600 are illustrated. A first chain drive 650 includes a first lower sprocket 654 and a first upper sprocket 652, and a second chain drive 670 includes a second lower sprocket 674 and a second upper sprocket 672 (see FIG. 20). The first lower sprocket 654 is mechanically keyed with the second lower sprocket 674, and the first upper sprocket 652 is mechanically keyed with the second upper sprocket 672. The first chain drive 650 has a first continuous chain 656, and the second chain drive 670 has a second continuous chain 676 (see FIG. 20). Both the first chain 656 and the second chain 670 rotate in a counterclockwise direction, illustrated as the direction line D.

The first chain drive 650 and the second chain drive 670 both travel through a rotation inside the outer housing 614, from the inlet loading portion 604 to the dispensing outlet portion 602, and then back to the inlet loading portion 604.

A first elongated rail 662, a second elongated rail 664, a third elongated rail 666, and a fourth elongated rail 668 direct and guide the first drive chain 650 as it rotates around the first upper sprocket 652 and the first lower sprocket 654. Similarly, for the second drive chain 670, a fifth elongated rail 682, a sixth elongated rail 684, a seventh elongated rail 686, and an eighth elongated rail 688 direct and guide the second drive chain (see FIG. 20).

A plurality of carrier gears 644 are attached to both the first drive chain 656 and the second drive chain 676. A first plurality of movable carriers 658 (also sometimes referred to herein as a first plurality of elevators or movable shelves) are mounted to the plurality of carrier gears 644 that are mounted onto the first drive chain 656. A second plurality of movable carriers 660 (also sometimes referred to herein as a second plurality of elevators or movable shelves) are mounted to the plurality of carrier gears 644 that are mounted onto the second drive chain 676. The first plurality of carriers 658 and the second plurality of carriers 660 are formed as pairs of angle brackets, which are each mounted so as to be level (in parallel with respect to the vertical), so as to hold the cartridges 32 (see FIG. 22, for example). The first plurality of movable carriers 658 is positioned opposite the second plurality of movable carriers 660 so as not to be in contact with each other, and to exhibit an open space therebetween.

When the first chain drive 650 and the second chain drive 670 are rotating, each set of paired (parallel) carriers 658 and 660, and the plurality of carrier gears 644, move along the path of the two chain drives. The plurality of paired carriers 658 and 660 stay substantially level to each other and to the guide S/A 620. When the cartridges of fasteners 32 are loaded by a user into the loading station 600, the fasteners are placed onto each of the sets of paired carriers 658 and 660 so that the staple legs are resting on each carrier-half (i.e., on each of the angle brackets of the pair).

During a loading event, one pair of the plurality of paired carriers 658 and 660 travel from above the guide S/A 620 to below the guide S/A. Due to the 'gap' or 'opening' between the paired carriers 658 and 660, the horizontal portion of the staples 32 catch on the horizontal pusher 628 and the cartridge 32 is held on the horizontal pusher until loaded into the automatic fastener driving tool. This process repeats until the loading station 600 has deployed all of its cartridges of staples 32. A user then manually loads each paired carrier via the loading door 604.

A first rail 632 is mounted external to the housing 614. The first rail 632 exhibits a first elongated slot 636 and a second elongated slot 637. A first plurality of fasteners 640 are mounted in the first and second elongated slots 636 and 637. A second rail 634 is mounted external to the housing 614, opposite the first rail 632 (see FIG. 25). The second rail 634 exhibits a third elongated slot 638 and a fourth elongated slot 639 (illustrated on FIG. 25). A second plurality of fasteners 642 are mounted in the third and fourth elongated slots 638 and 639, as depicted on FIG. 25.

Figure 20:
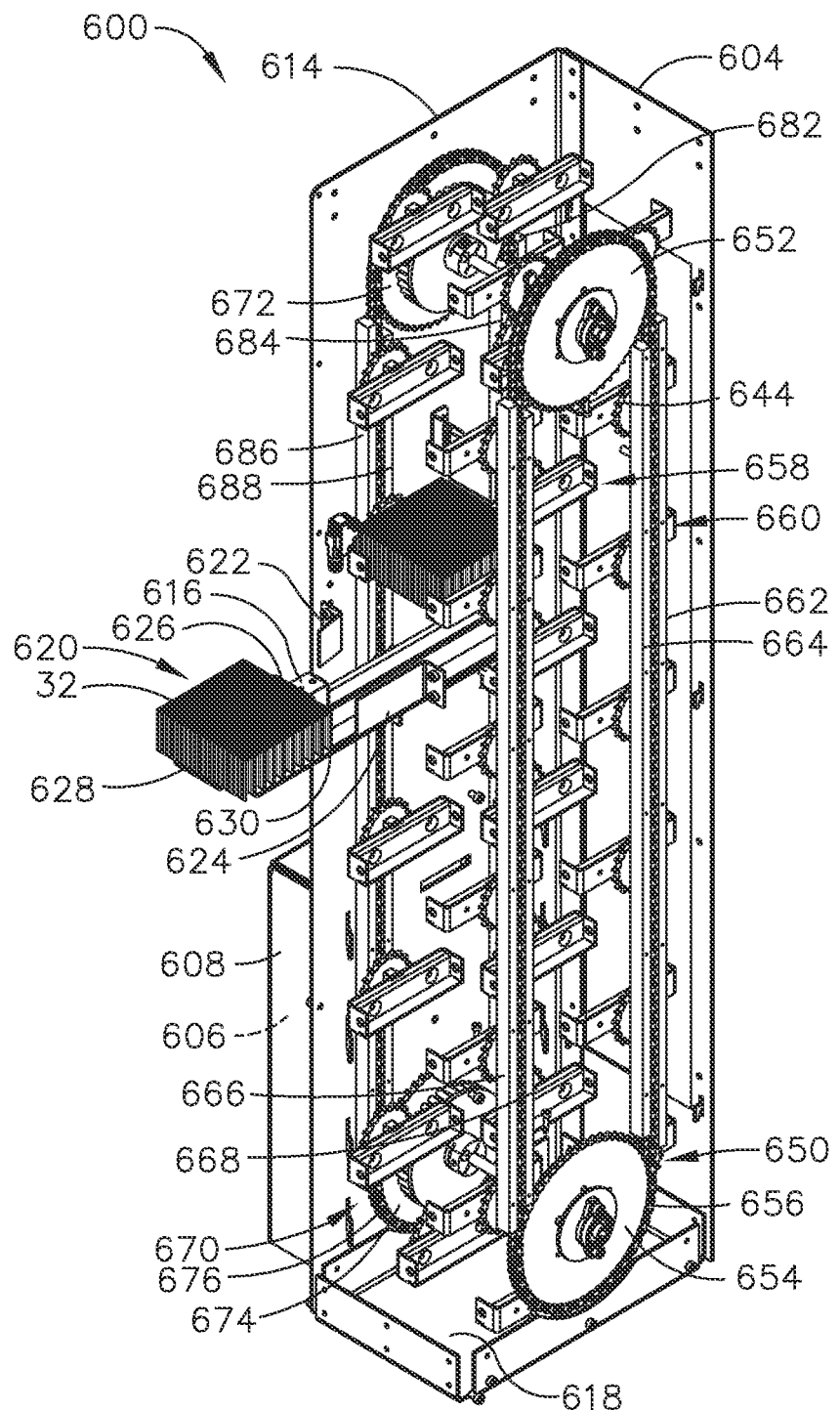
FIG. 20 is a front left perspective view of the loading station of FIG. 18, showing some of the inner mechanical features.

Referring now to FIG. 20, a further view of the interior of the loading station 600 is depicted, as well as a base portion 618. FIG. 20 more clearly illustrates each paired carrier set 658 and 660, and the plurality of carriers 658 and 660 are mounted along the entire length of both the first and second drive chains 656 and 676. When the motor 606 is started, the motor rotates a lower gear shaft 649, which rotates both the first lower sprocket 654 and the second lower sprocket 674. Then, both lower sprockets 654 and 674 force the first drive chain 656 and the second drive chain 676 to begin rotating in a counterclockwise direction. The two chains 656 and 676 force the first upper sprocket 652 and the second upper sprocket 672 to rotate in sync with the lower sprockets 654 and 674 as long as the motor 606 is actuated. Since all of the sprockets 654, 674, 652, 672 and both chains 656 and 676 are rotating in sync with one another, the plurality of carriers 658 and 660 also rotate in sync. This synchronized rotation allows the plurality of carriers 658 and 660 to remain substantially parallel (level) to one another, and the carriers 658 and 660 can hold a single cartridge of fasteners 32 in each "pair" of carriers without dropping the cartridge.

Figure 21:
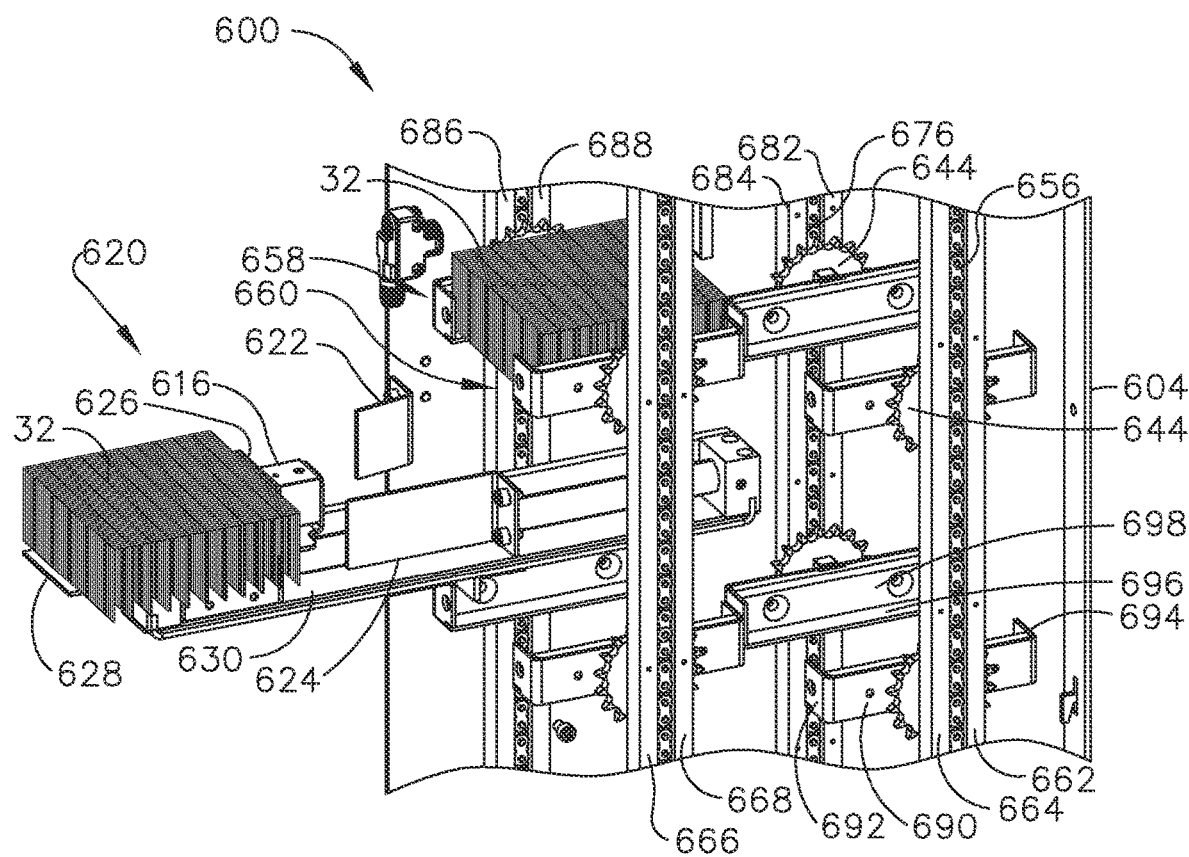
FIG. 21 is an enlarged view of the loading station of FIG. 18, illustrating some of the details of the fastener pusher and carriers.

Referring now to FIG. 21, an enlarged view of a portion of the interior of the loading station 600 is illustrated. The plurality of carriers 658 and 660 exhibit a front wall 692, a rear wall 694, and a floor portion 696. The first plurality of carriers 658 include a first elongated wall 690 proximal to the first chain drive 656, and the second plurality of carriers 660 include a second elongated wall 698 proximal to the second chain drive 676. The elongated walls 690 and 698 face each other with the floor portions 696 between them. This configuration allows a cartridge 32 to be placed onto the plurality of carriers 658 and 660 such that it cannot slip off. The front walls 692 and the rear walls 694 also ensure the cartridges 32 seat securely onto the plurality of carriers 658 and 660.

Figure 22:
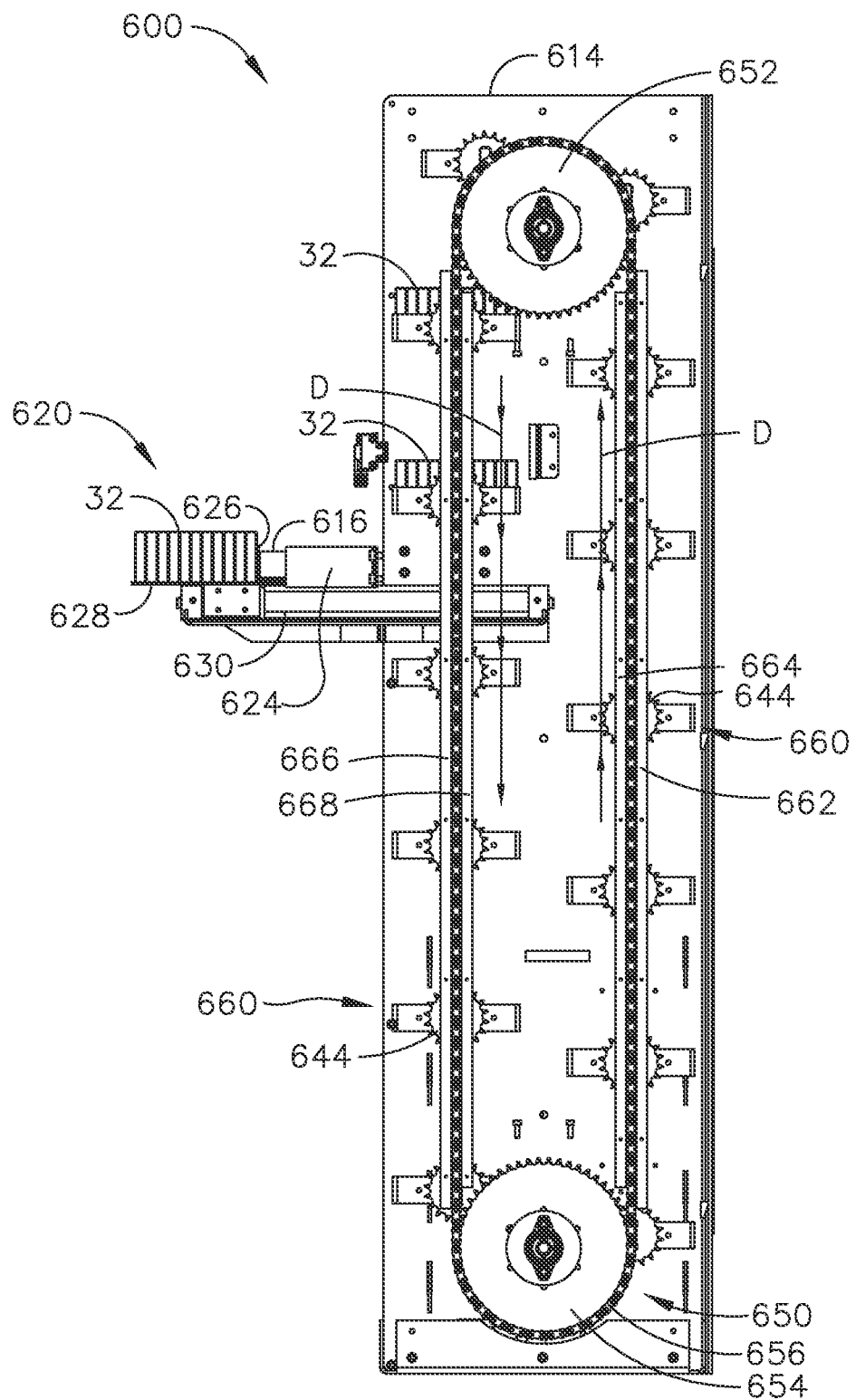
FIG. 22 is a left side elevation view of the loading station of FIG. 18, with several cartridges of fasteners loaded.

Referring now to FIG. 22, several cartridges of fasteners 32 are depicted loaded in the loading station 600. One cartridge 32 is loaded on the horizontal pusher 628 and ready to be inserted into the magazine of the fastener driving tool. Two other cartridges 32 are waiting to be sequentially loaded onto the pusher 616. In FIG. 22, the loading station 600 has almost dispensed all of its cartridges 32, which means a user will need to reload the plurality of carriers 658 and 660 once all of the cartridges have been dispensed.

FIG. 23 illustrates a cartridge 32 having just been loaded onto the pusher 616. As discussed above, the two chain drives 650 and 670 rotate in a counterclockwise direction, and one of the plurality of carriers 658 and 660 travels directly over the pusher 616. Since there is a gap between both floors 696 of each carrier 658 and 660, the cartridge 32 is 'dropped' onto the horizontal pusher 628, while the carriers continue moving counterclockwise and out of the way of the pusher 616.

FIG. 24 depicts the pusher 616 having actuated and moved the cartridge 32 through the opening at exit end 602 and all the way 'left' (in this view) on the loading arm 630. Once this cartridge 32 has finished loading into the tool's magazine, the pusher 616 will retract back inside the loading station 600 to wait for the next cartridge 32.

Figure 25:
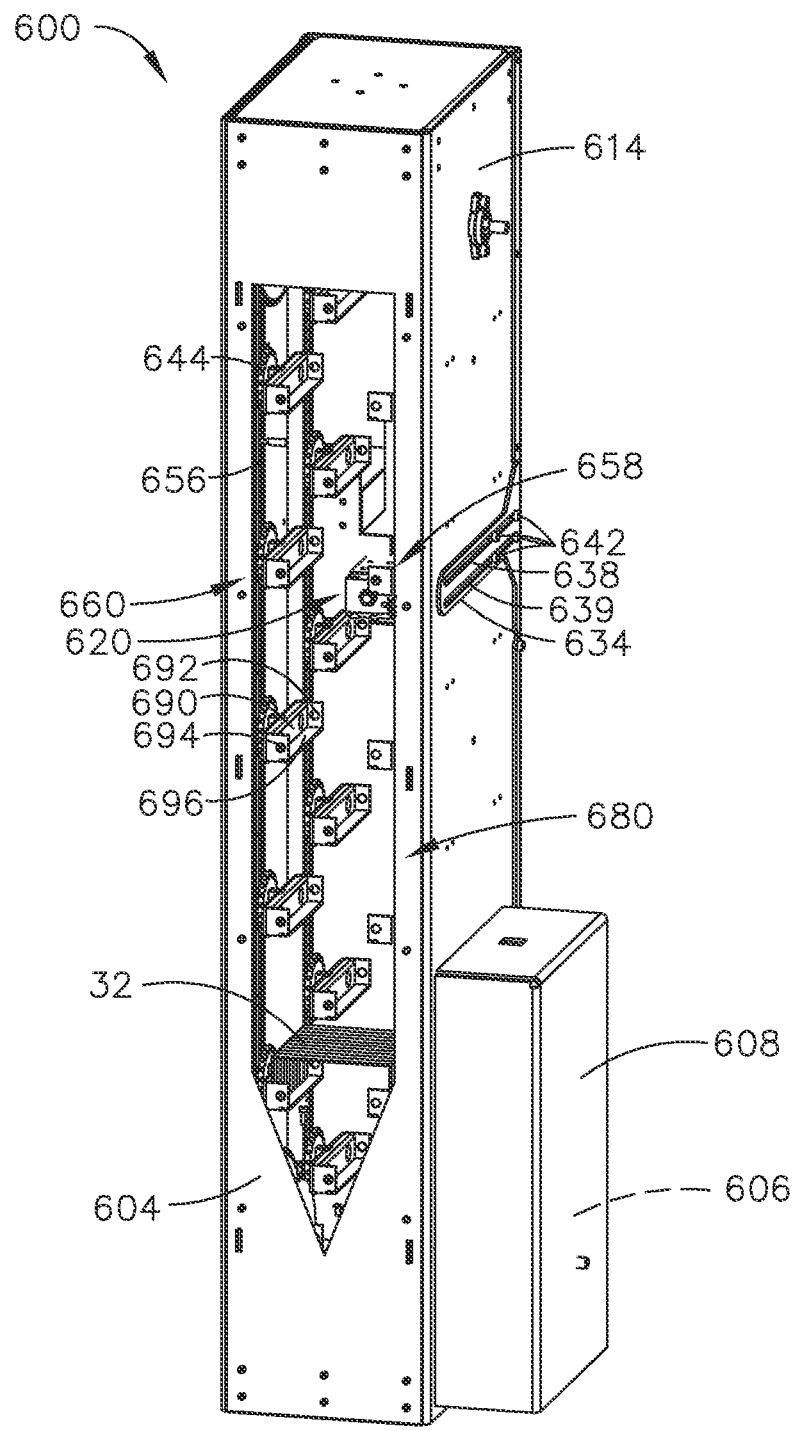
FIG. 25 is a rear right perspective view of the loading station of FIG. 18.

Referring now to FIG. 25, a rear view of the loading station 600 is depicted. The loading door 604 has an opening 680, and this opening can be left open for easy access to the interior of the loading station 600, or be filled in with glass or acrylic, for example. It is preferable to fill in the opening 680 to help keep dust and other workplace contaminants out of the loading station 600 as much as possible.

Figure 30:
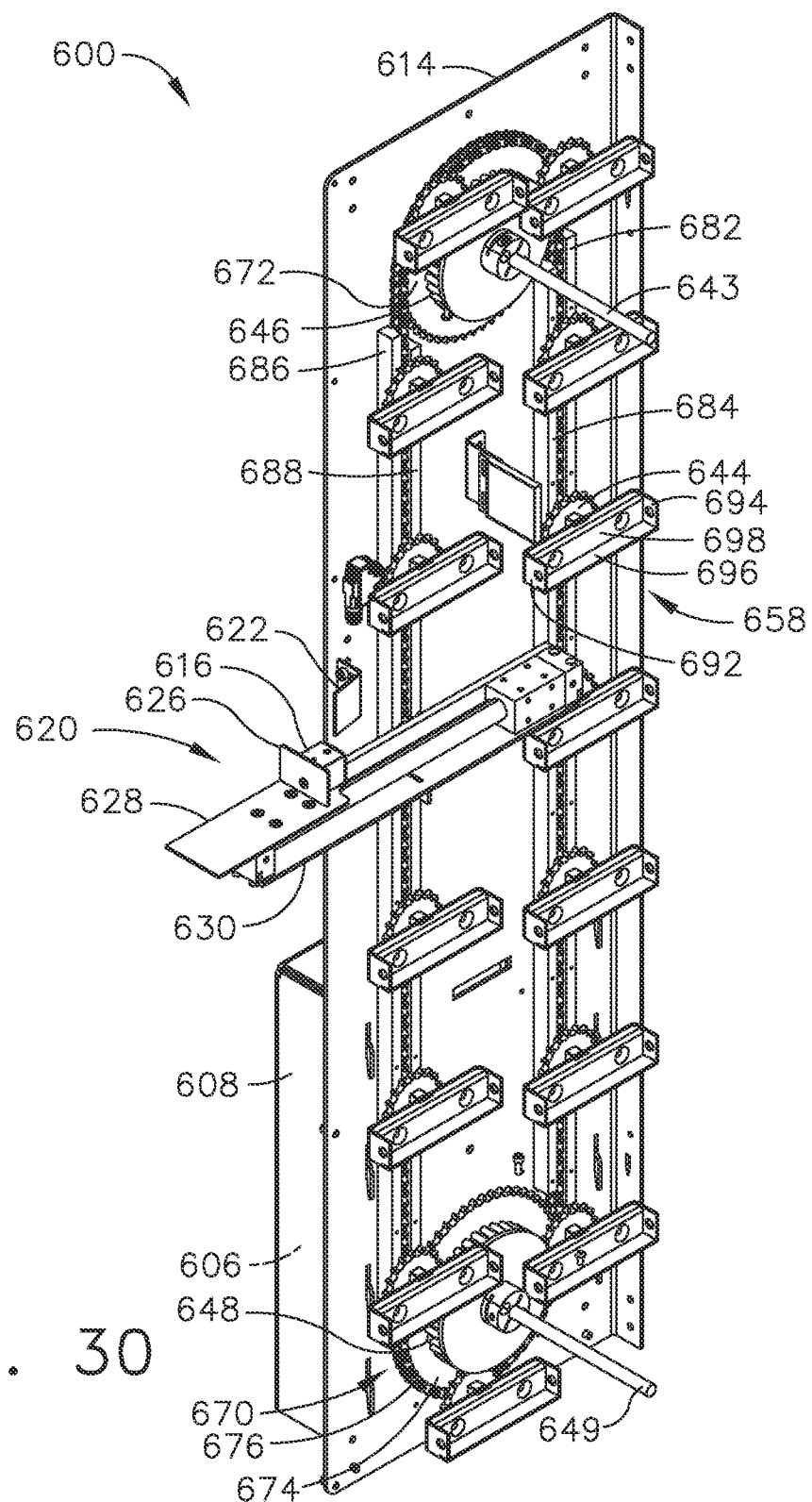
FIG. 30 is a left side perspective view of the loading station of FIG. 18.

Referring now to FIG. 30, most of the automatic loader 600 is not shown in this view to better illustrate the second chain drive 670. The second chain drive 670 includes a second upper sprocket 672 and a second lower sprocket 674 (as discussed above). A first upper levelling gear 646 is in mechanical communication with the second upper sprocket 672, and a first lower levelling gear 648 is in mechanical communication with the second lower sprocket 674. It should be noted that the first upper sprocket 652 and the first lower sprocket 654 are in mechanical communication with a second upper levelling gear 633 and a second lower levelling gear 635, respectively (see FIGS. 41 and 42).

The motor 606 rotates the lower gear shaft 649 (also sometimes referred to herein as a 'second gear shaft') during operation. All of the lower gears are in mechanical communication with this lower gear shaft 649. An upper gear shaft 643 (also sometimes referred to herein as a 'first gear shaft') is in mechanical communication with all of the upper gears. When the second chain drive 670 and the first chain drive 650 are in motion, the lower gear shaft 649 drives the rotation, and the upper gear shaft 643 rotates simultaneously due the mechanical linkages between the first drive chain 656 and the second drive chain 676. The plurality of carrier gears 644 contact the first upper levelling gear 646 and the first lower levelling gear 648 during the rotation of the first and second chain drives 650 and 670. (Similarly, the plurality of carrier gears 644 contact the second upper levelling gear 633 and second lower levelling gear 635 in the same manner.)

Figure 31:
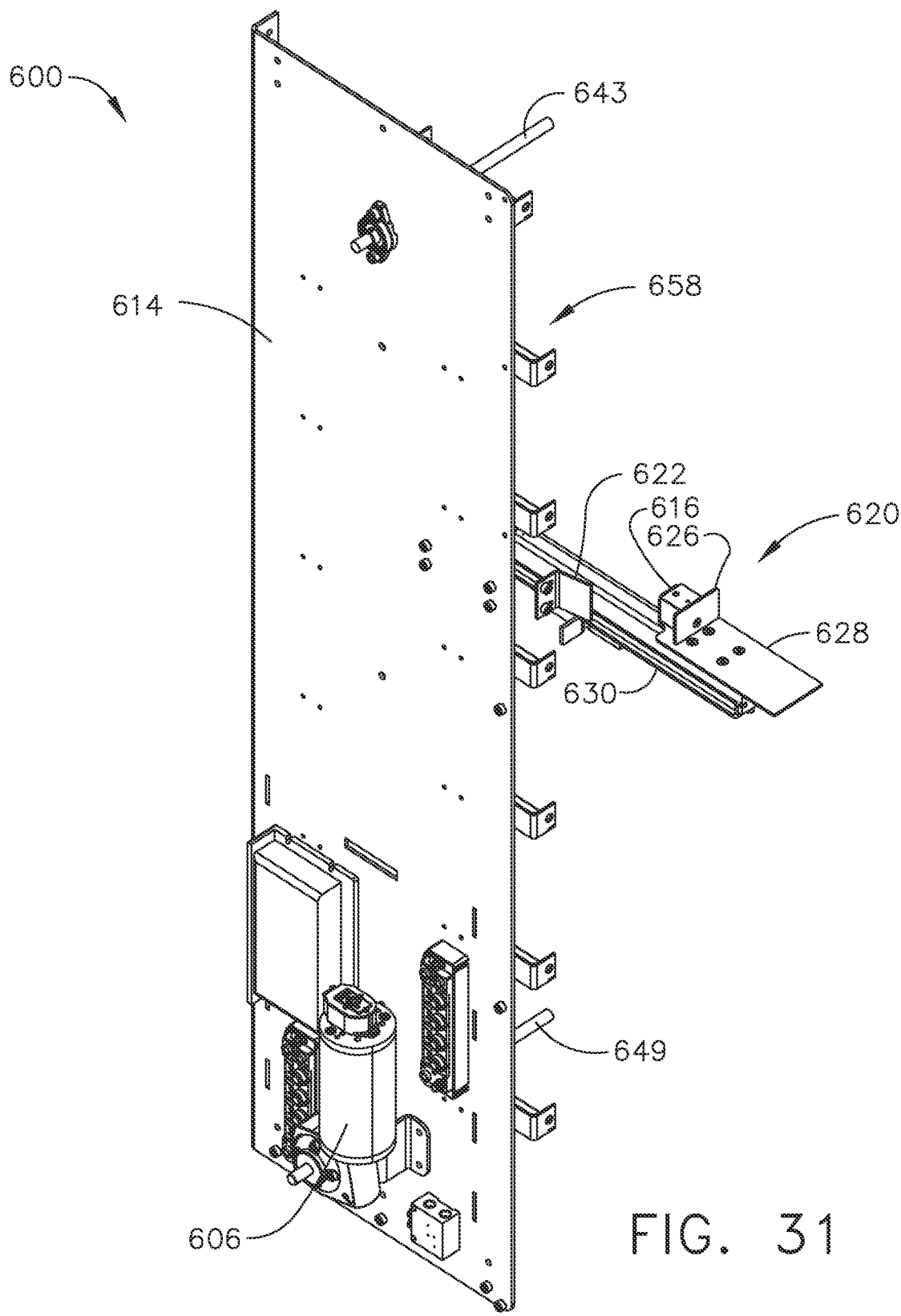
FIG. 31 is a partial right side perspective view of the loading station of FIG. 18, showing the motor portion.

Referring now to FIG. 31, the motor 606 is depicted proximal to the base 618 of the automatic loader 600. The motor housing 608 is not shown in this view. As discussed above, the motor 606 drives the lower gear shaft 649 when the chain drives 650 and 670 are in operation.

Figure 32:
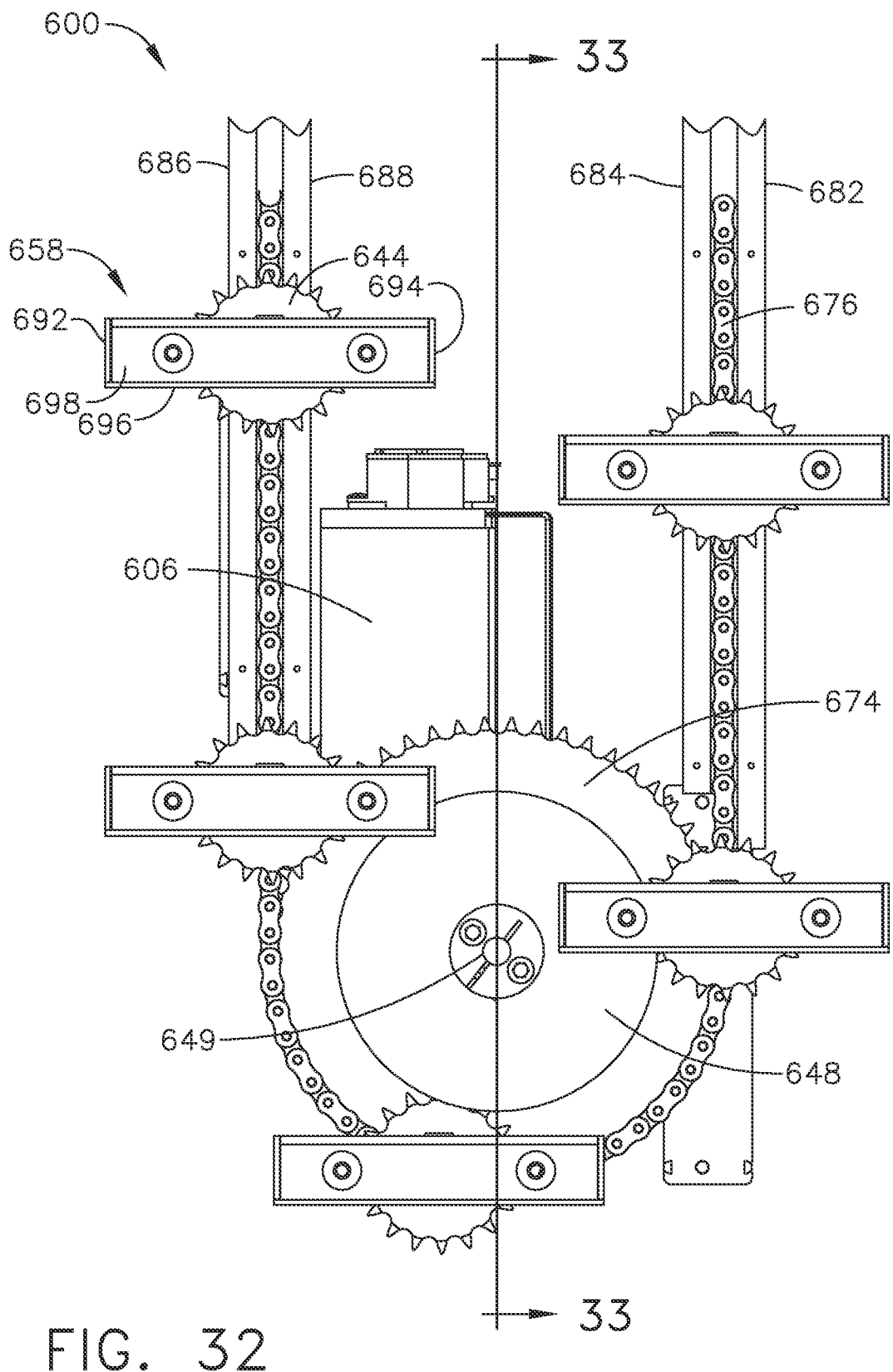
FIG. 32 is a partial left elevation view of the loading station of FIG. 18, showing some of the carriers proximal to the lower gears.

Referring now to FIG. 32, some of the plurality of carrier gears 644 are depicted rotating about the first lower levelling gear 648. During this rotation, each carrier 658 remains substantially parallel to the base 618 of the automatic loader 600. The carrier parallel movement is made possible due to a sun and planet gear set mounted inside the first lower levelling gear 648 (see FIG. 36). It should be noted that separate sun and planet gear sets are also mounted inside the first upper levelling gear 646, the second upper levelling gear 633, and the second lower levelling gear 635 (see FIGS. 40-42).

Figure 33:
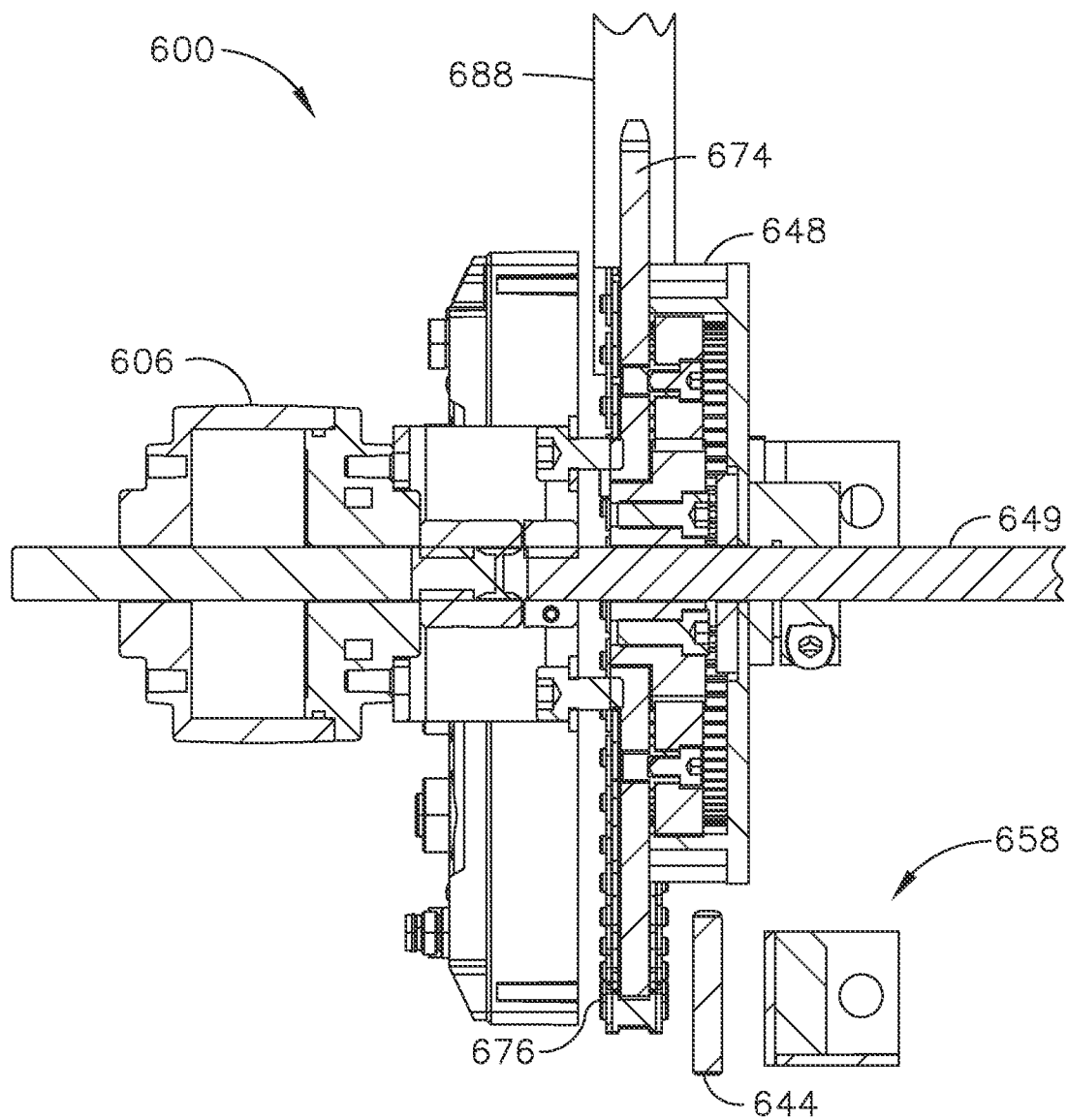
FIG. 33 is a cutaway view along the line 33-33 of FIG. 32.

Referring now to FIG. 33, a cutaway view along the line 33-33 of FIG. 32 is depicted. As can be seen in FIG. 33, the lower gear shaft 649 travels through both the first lower levelling gear 648, the second lower sprocket 674, and the motor 606.

Figure 34:
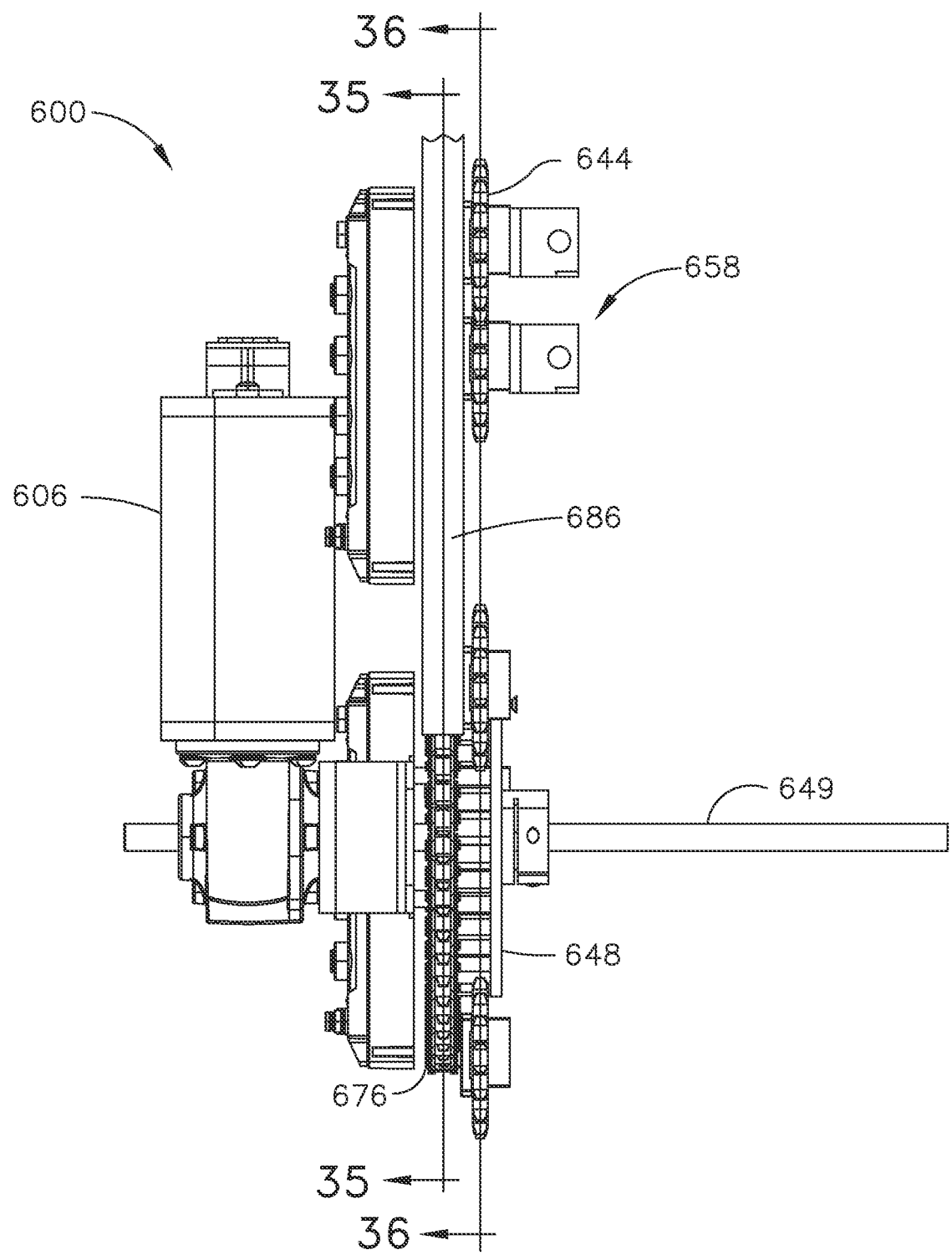
FIG. 34 is a partial front elevation view of the loading station of FIG. 18, showing some of the carriers contacting one of the lower gears.

Referring now to FIG. 34, the spacing between the second drive chain 676 and the plurality of carrier gears 644 is depicted. The plurality of carrier gears 644 never comes into contact with the second drive chain 676; however, the plurality of carrier gears 644 contact and mesh with the first lower levelling gear 648 as each carrier 658 is rotated around the lower gear shaft 649.

Figure 35:
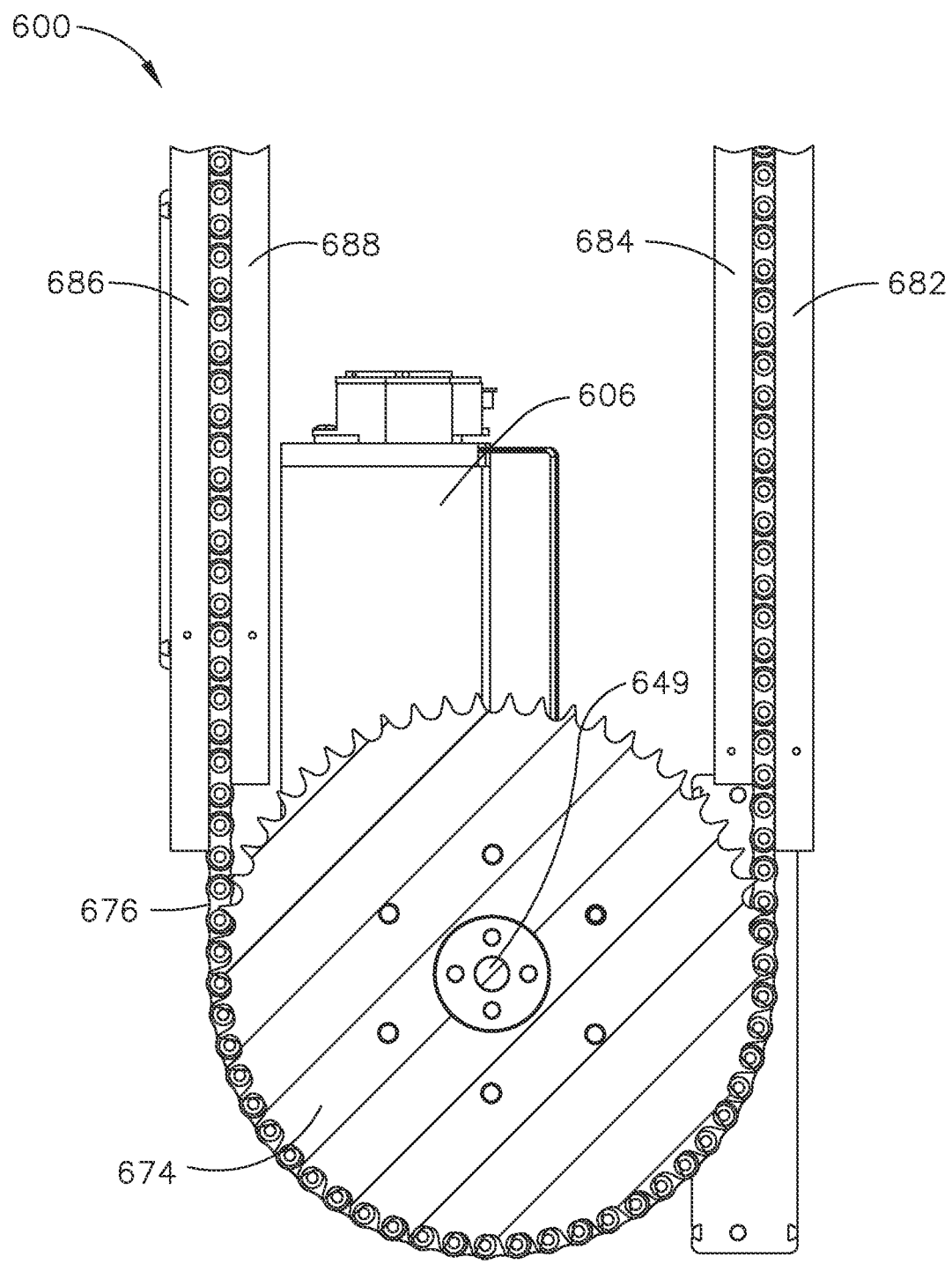
FIG. 35 is a cutaway view along the line 35-35 of FIG. 34.

Referring now to FIG. 35, the second drive chain 676 and second lower sprocket 674 are depicted. The fifth, sixth, seventh, and eighth elongated guides 682, 684, 686, 688 keep the second drive chain 676 oriented in a manner that keeps the carriers 658 substantially parallel to the base 618 of the automatic loader 600 during operation.

Figure 36:
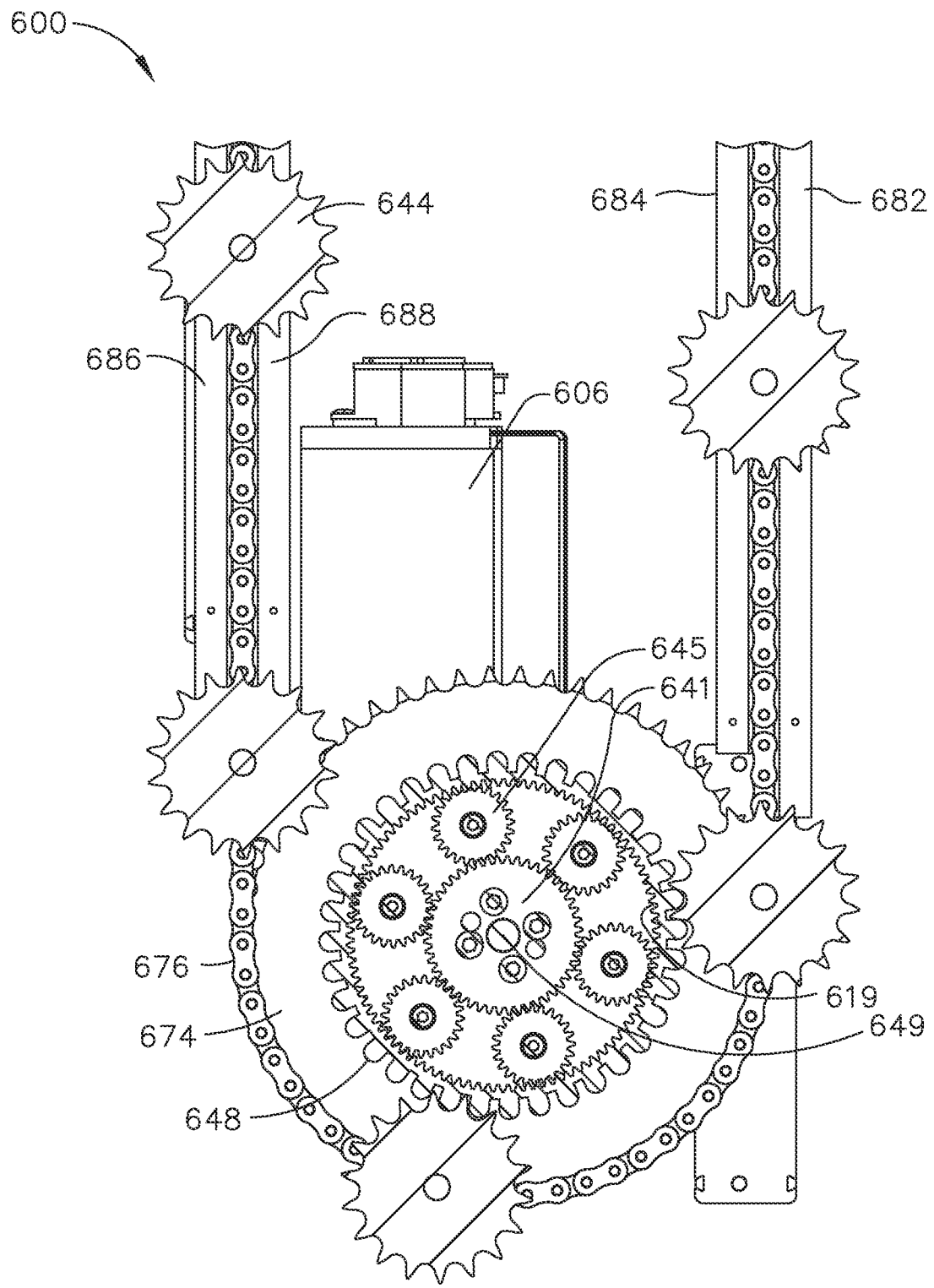
FIG. 36 is a cutaway view along the line 36-36 of FIG. 34.

Referring now to FIG. 36, a first sun gear 641 and a first plurality of planet gears 645 are depicted mounted in a first lower ring gear 619. The first lower ring gear 619 is part of the inner circumference of the first lower levelling gear 648. During operation, when each carrier gear 644 (and its associated carrier 658) is moved into contact with the first lower levelling gear 648, the first sun gear 641 and the plurality of planet gears 645 rotate with the first lower ring gear 619 to ensure that the carrier 658 orientation remains substantially parallel to the base 618 of the automatic loader 600, until that carrier gear 644 has moved out of contact with the first lower levelling gear 648.

The plurality of carrier gears 644 do not rotate during operation, until they contact one of the first upper levelling gear 646, first lower levelling gear 648, second upper levelling gear 633, or second lower levelling gear 635, and then the rotation is only enough to keep each carrier 658 substantially parallel to the base 618 of the loader 600, until contact ceases. After this contact ceases, the elongated rails 636, 637, 638, 639, 662, 664, 666, 668 ensure that the carriers 658 remain substantially parallel to the base 618 of the loader 600 until each carrier gear 644 comes into contact with one of the other levelling gears 646, 648, 633, or 635 again.

In FIG. 36, the plurality of planet gears 645 is illustrated as six separate planet gears. It is contemplated that a designer could increase or decrease the number of planet gears, while simultaneously increasing or decreasing the size of the first sun gear 641 and/or the first lower levelling gear 648. The exact design and number of planet gears depends on the size of the lifter and how far the carriers 658 must travel around the first lower levelling gear 648 in order for the sun and planet gears to maintain an orientation such that each carrier remains substantially parallel to the base 618 of the loader 600.

Figure 40:
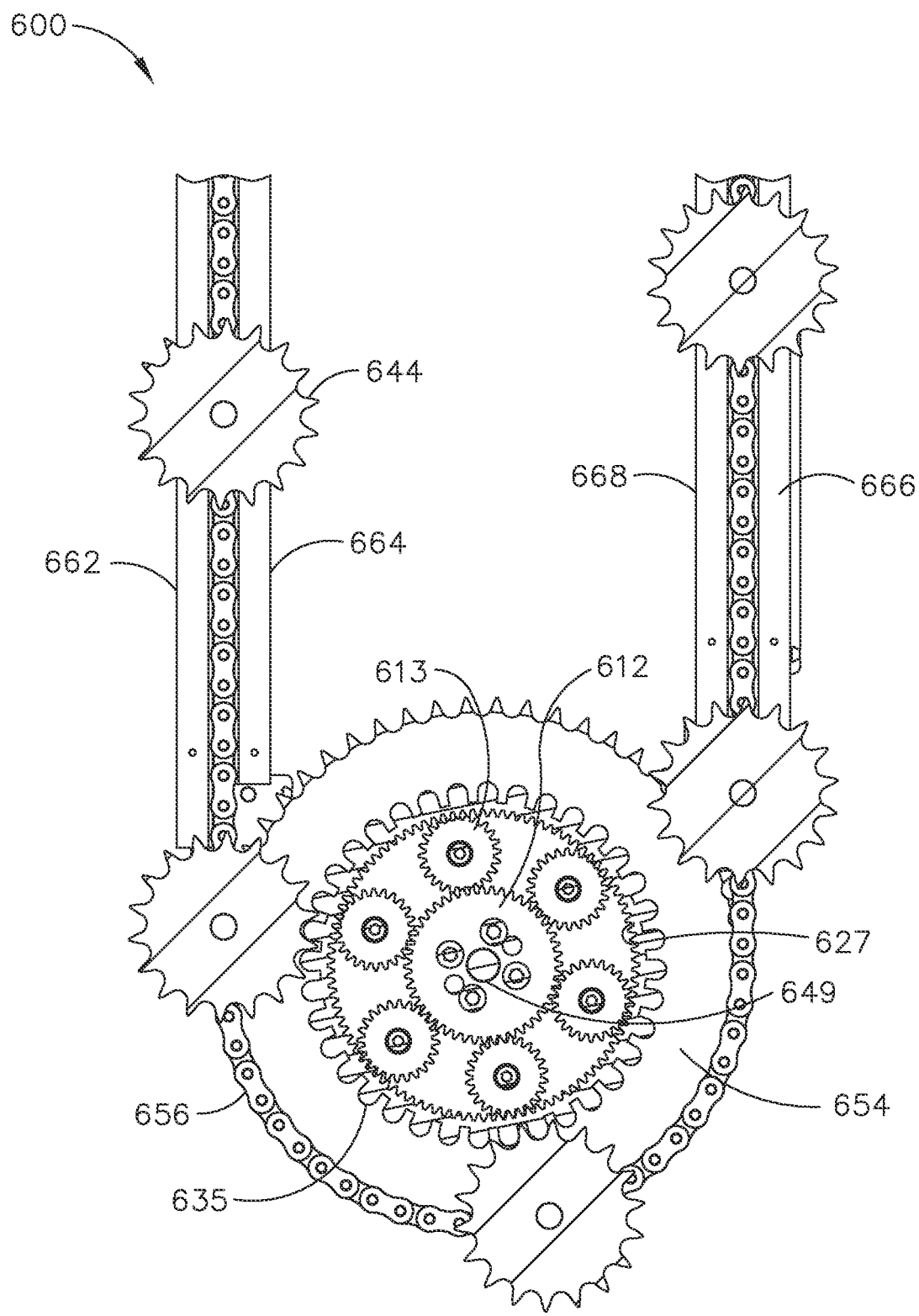
FIG. 40 is a partial side cutaway view of the loading station of FIG. 18, showing the first lower main gear.

Referring now to FIG. 40, a second sun gear 612 and a second plurality of planet gears 613 are depicted mounted in a second lower ring gear 627. The second lower ring gear 627 is part of the inner circumference of the second lower levelling gear 635. This second sun gear 612, second plurality of planet gears 613, second lower ring gear 627, and the second lower levelling gear 635 operate in a manner similar to the first sun gear 641, the first plurality of planet gears 645, and the first lower levelling gear 648 depicted in FIG. 36 and discussed above. The gears 612, 613, 635, and the sprocket 654 depicted in FIG. 40 are in mechanical communication with the gears 641, 645, 648, and the sprocket 674 depicted in FIG. 36, due to their mechanical linkage with the second gear shaft 649. It should be noted that the motor 606 directly drives the gears 612, 613, 635, and the sprocket 654 depicted in FIG. 40, because the first lower sprocket 654 is in direct mechanical communication with the second gear shaft 649.

Figure 41:
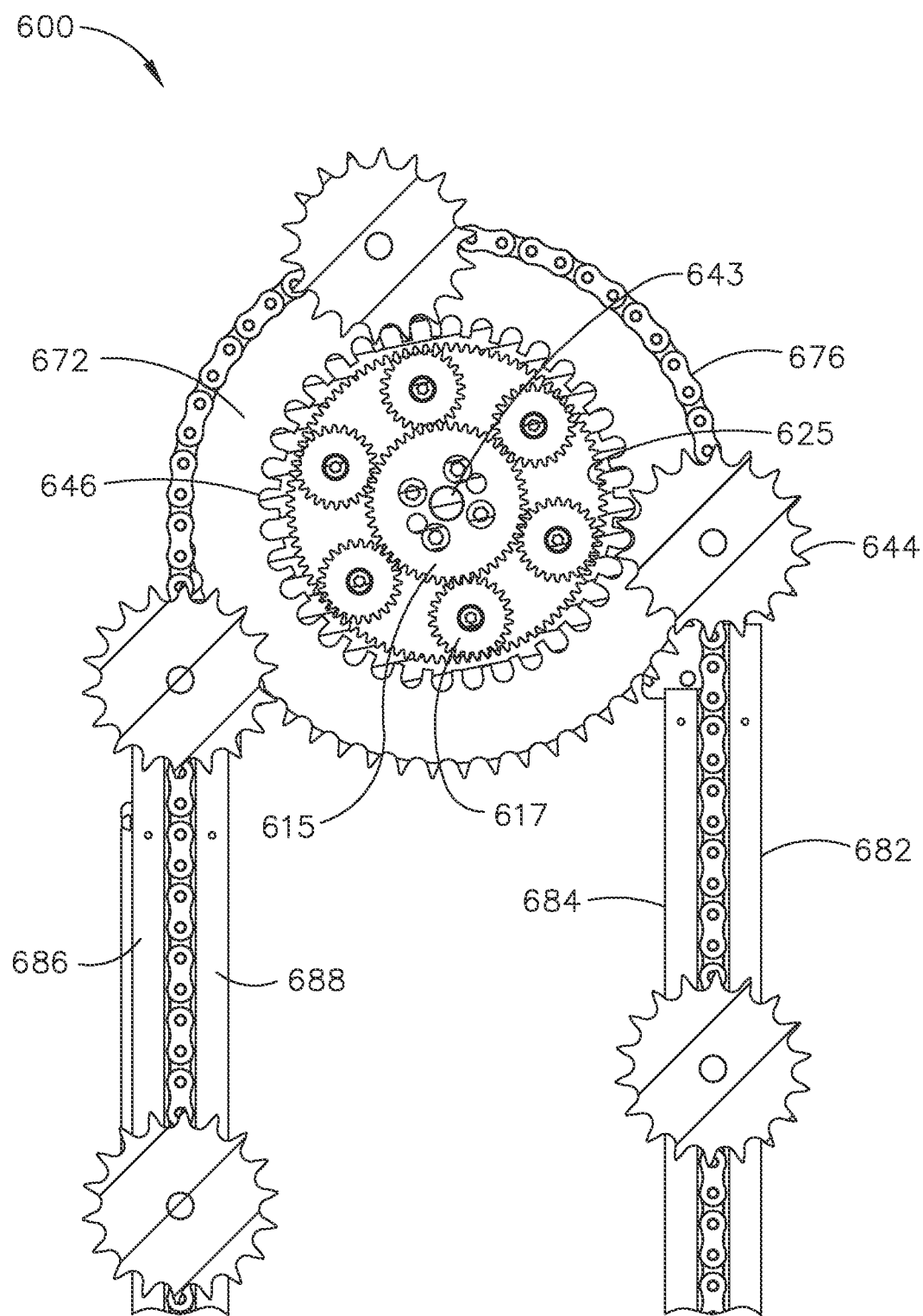
FIG. 41 is a partial side cutaway view of the loading station of FIG. 18, showing the second upper main gear.

Referring now to FIG. 41, a third sun gear 615 and a third plurality of planet gears 617 are depicted mounted in a first upper ring gear 625. The first upper ring gear 625 is part of the inner circumference of the first upper levelling gear 646. The first gear shaft 643 is not directly driven by the motor 606, but rotates when the motor 606 drives the second gear shaft 649, which in turn rotates the second lower sprocket 674 and the first lower sprocket 654. The two lower sprockets 654 and 674 rotations drive both chain drives 650 and 670, which in turn rotate the first upper sprocket 652 and the second upper sprocket 672. The gears 615, 617, 625, 646, and the sprocket 672 depicted in FIG. 41 operate in a manner similar to the gears depicted in FIGS. 36 and 40, apart from the motor 606 indirectly driving the rotation.

Figure 42:
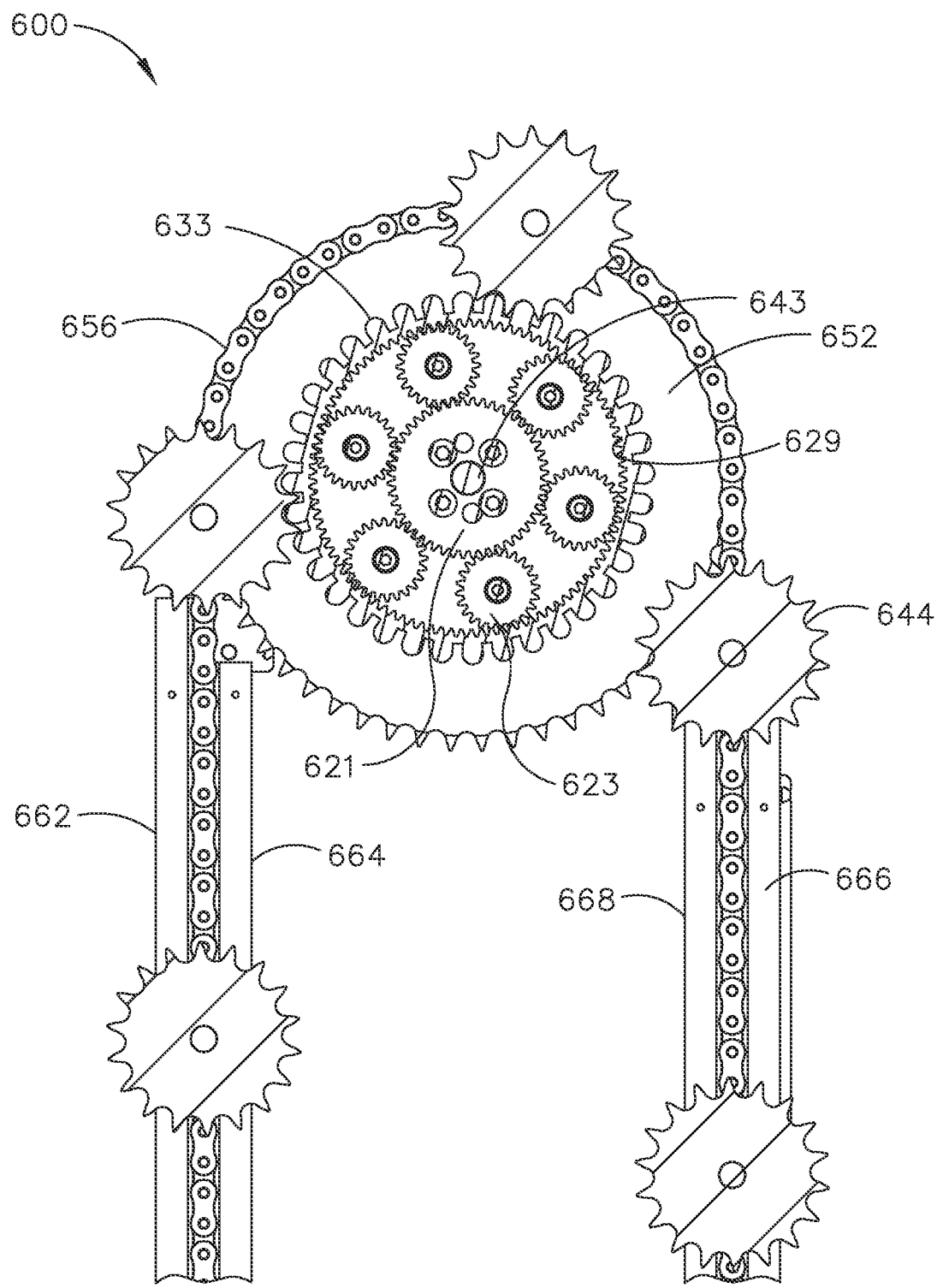
FIG. 42 is a partial side cutaway view of the loading station of FIG. 18, showing the first upper main gear.

Referring now to FIG. 42, a fourth sun gear 621 and a fourth plurality of planet gears 623 are depicted mounted in a second upper ring gear 629. The second upper ring gear 629 is part of the inner circumference of the second upper levelling gear 633. As noted above, the gears 621, 623, 629, 633, and the sprocket 652 depicted in FIG. 42 operate in a manner similar to the other gears depicted in FIGS. 36, 40, and 41. The gears 621, 623, 629, 633, and the sprocket 652 depicted in FIG. 42 are in mechanical communication with the gears 615, 617, 646, and the sprocket 672 depicted in FIG. 41 due to the first upper sprocket 652 and the second upper sprocket 672 both being in direct mechanical linkage with the first gear shaft 643.

Figure 43:
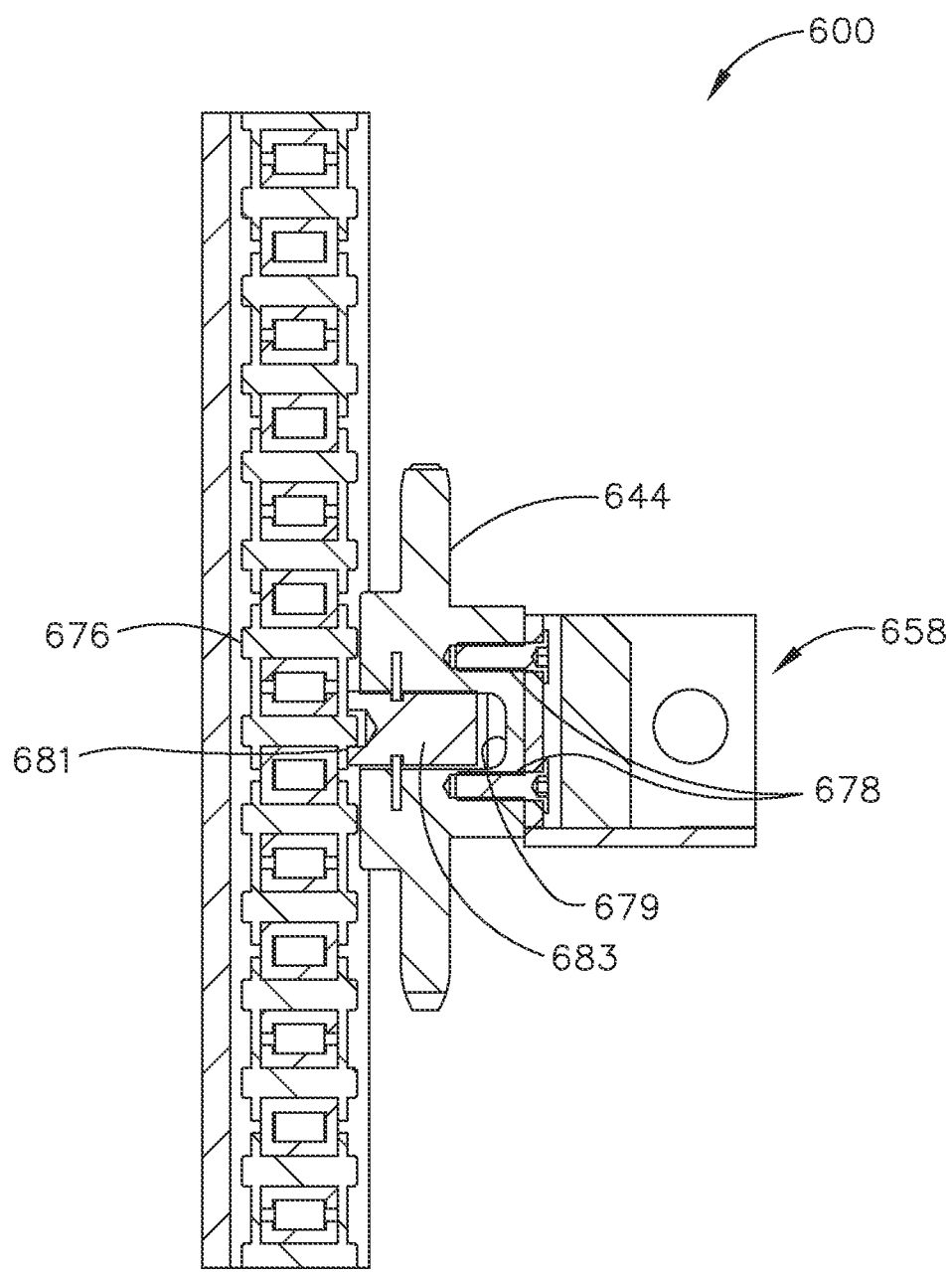
FIG. 43 is a partial side cutaway view of the loading station of FIG. 18, showing a single carrier gear and carrier mounted to one of the drive chains.

Referring now to FIG. 43, a preferred way to mount one of the first movable carriers 658 and one of the carrier gears 644 to the second drive chain 676 is depicted. The carrier gear 644 exhibits a blind hole 679 that fits over a carrier shaft 683, and this carrier shaft 683 is mounted to the second chain drive 676 at a connected end 681. A pair of carrier fasteners 678 are used to securely attach the first movable carrier 658 to the carrier gear 644. When the loading station 600 is in operation, the carrier gear 644 is able to rotate about the carrier shaft 683 when the carrier gear 644 comes into contact with one of the levelling gears 633, 635, 646, and 648, thereby keeping the moveable carrier 658 substantially parallel to the base 618.

Third Alternative Embodiment

Figure 26:
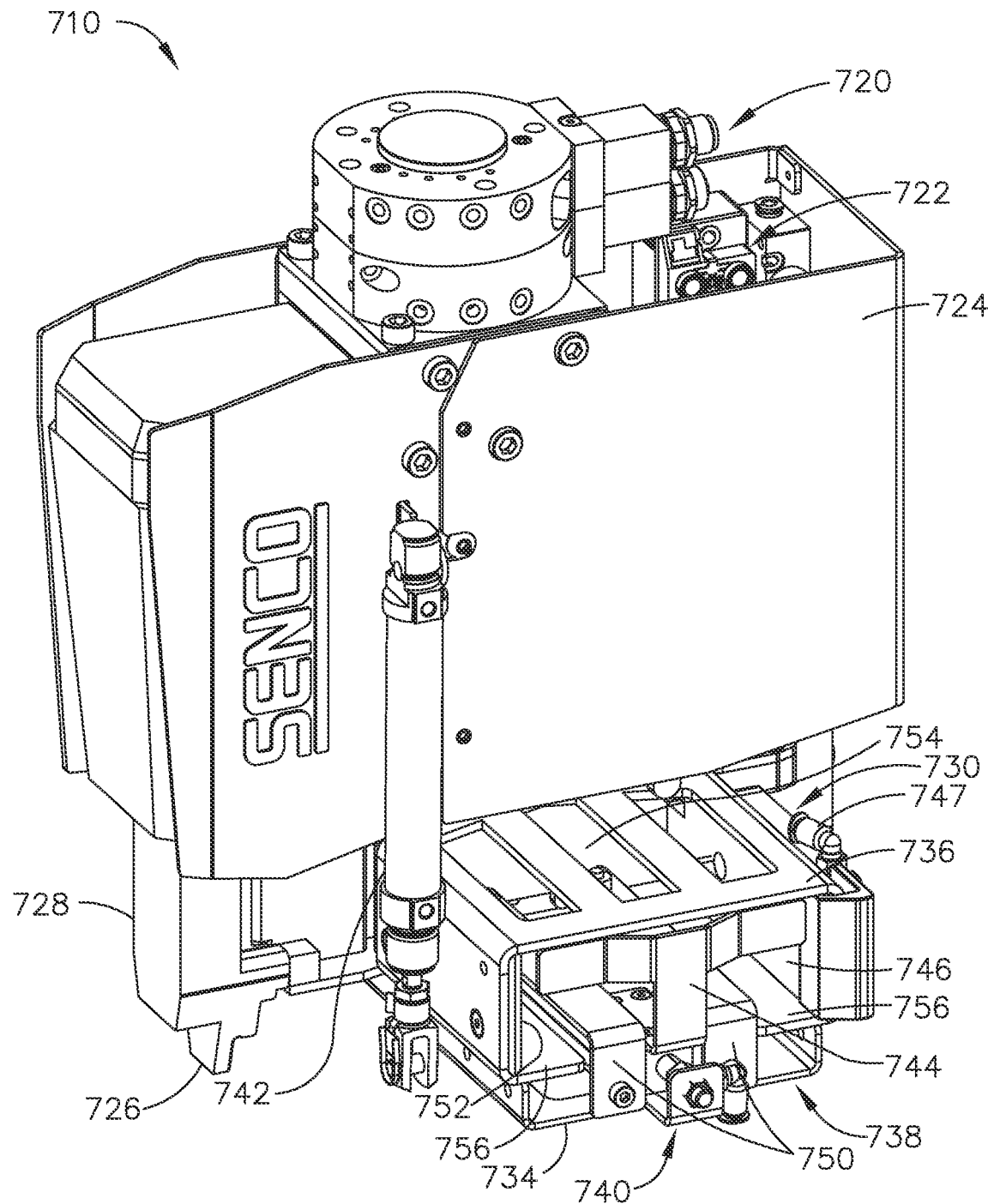
FIG. 26 is a front left perspective view of a third alternative embodiment of an automatic fastener driving tool with an automatic side-loading magazine, as constructed according to the principles of the technology disclosed herein.

Referring now to FIG. 26, a third alternative embodiment automatic fastener driving tool is generally designated by the reference numeral 710. The tool 710 includes at least one external pressurized gas connector 720, at least one connector 722 for an external controller, a fastener exit end 726, a guide body 728, and an outer housing 724.

The tool 710 also includes a magazine 730 which is automatically actuated so that the loading station 600 can then automatically load a cartridge of fasteners 32. An external controller 810 (see FIG. 39) can send commands to the tool 710 during operation. For example, the tool 710 can drive fasteners until the magazine 730 is emptied, then the magazine 730 can be opened to accept a cartridge 32 from the loading station 600.

The magazine 730 includes several features to assist with the automated loading sequence. A first piston 742 is actuated to open and close a pivotable door 734 on the magazine 730. The first piston 742 can receive actuation commands from the external controller 810, or an on-board CPU 840 (see FIG. 39). The magazine 730 also includes a cover 736, a receiving portion 738 (for a fastener cartridge 32), and a clamp sub-assembly ('S/A') 740.

The clamp S/A 740 is mounted to the door 734, and includes a holder 744 to prevent a fastener cartridge 32 from falling out of the magazine 730, and a pair of removably attachable plates 750. These plate 750 can exhibit a varying height depending on the type of fastener loaded into the magazine 730. If short fasteners are being loaded, then the plates 750 can be mounted that have a low height profile (measured from the door 734 to the top of the plates 750). Alternatively, if tall fasteners are being loaded, then the plates 750 can be swapped out for ones that have a higher height profile.

Other features of the magazine 730 include a front plate 752, a rear plate 746 that keeps tension on the fastener cartridge 32 (i.e., it forces the cartridge towards the front plate), a magazine pusher 748 (see FIGS. 27-29), a stopper plate 754 at the deepest portion of the magazine, and a pair of support plates 756 which help support the fastener cartridge 32 during a loading event. The rear plate 746 is biased by a second piston 747 which forces the rear plate 746 towards the stopper plate 754, and the on-board CPU 840 can 'reset' the rear plate 746 (i.e., move the rear plate 746 in a direction opposite to the stopper plate 754) to accept a new cartridge of fasteners 32 once the previous cartridge has been used. As described above, during a loading event, the door 734 and the plates 750 open and drop down and away from the magazine 730. When the loading station 600 pushes a fastener cartridge 32 into the receiving portion 738, the legs of the staples slide and then rest on the support plates 756, until the door 734 is closed. At that point, then the plates 750 as well as the support plates 756 hold the fastener cartridge 32 in the magazine.

The construction of the magazine 730 fully encloses the fasteners 32 when the tool 710 is in use. Due to this construction, the tool 710 can be utilized in any position in a three-dimensional working environment.

Figure 27:
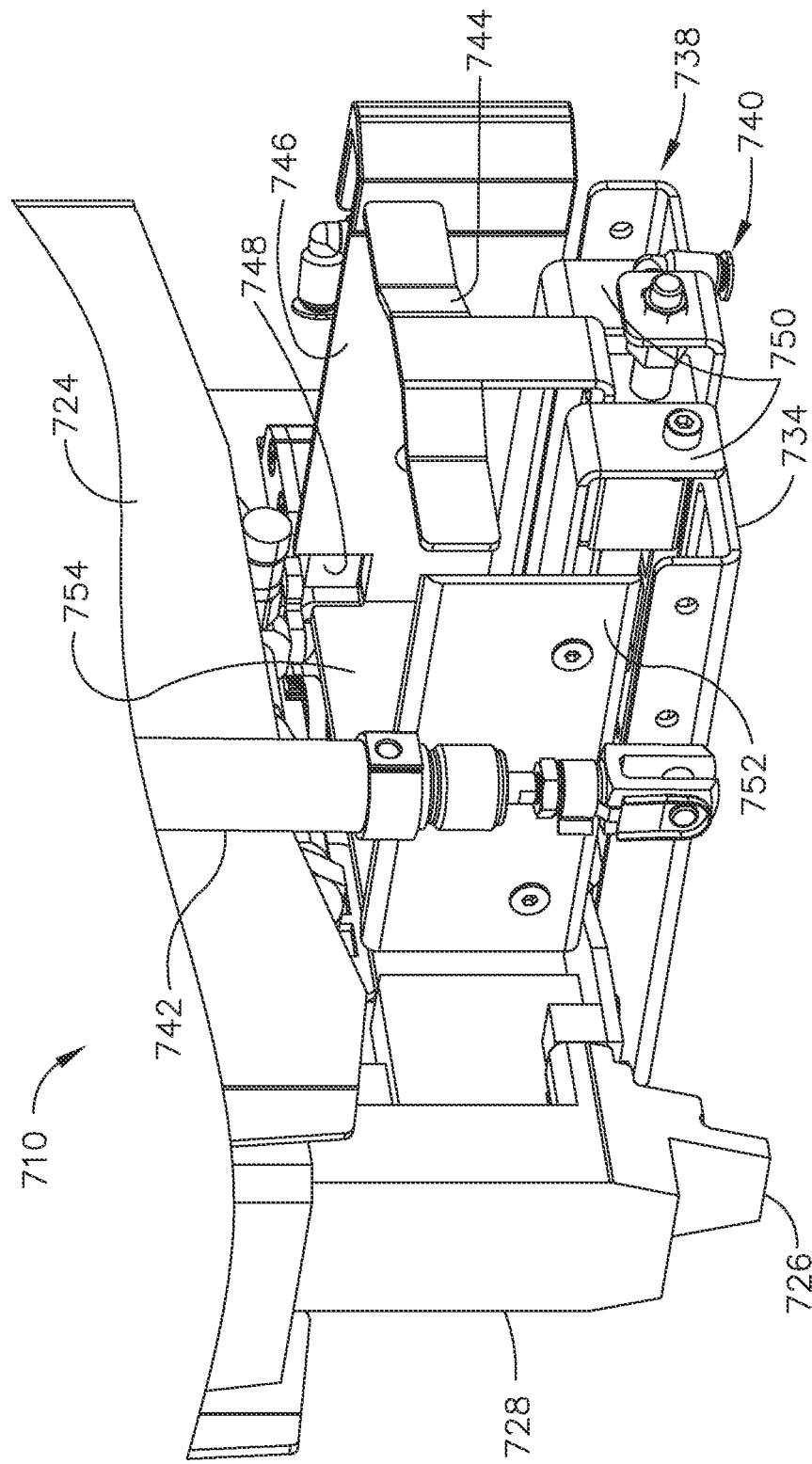
FIG. 27 is an enlarged view of the tool of FIG. 26, showing certain details of the magazine.

Referring now to FIG. 27, the cover 736 is not shown in this view in order to better depict the magazine pusher 748. FIG. 27 also provides a close view of the height of the plates 750.

Figure 28:
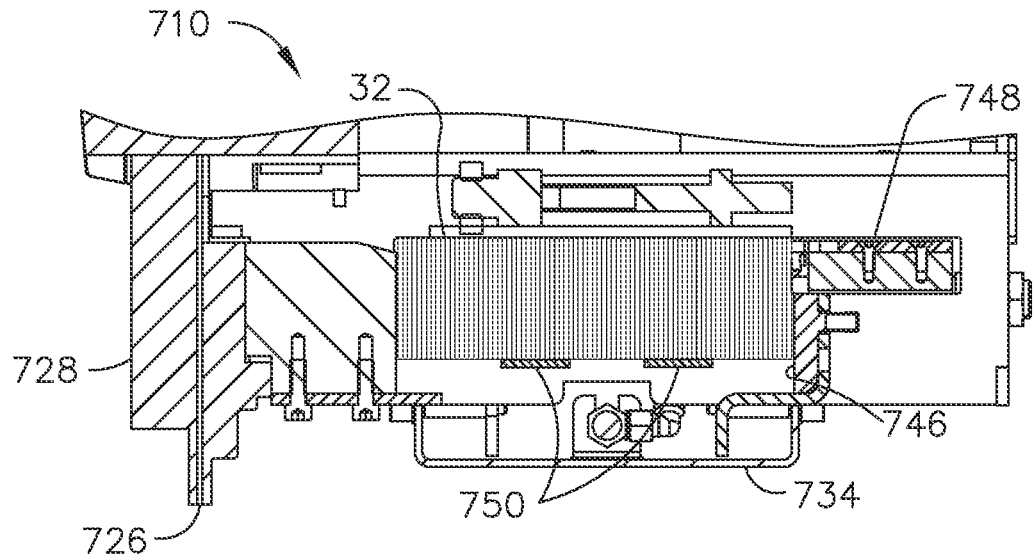
FIG. 28 is a left side cutaway view of the tool of FIG. 26, showing the initial position of a loaded cartridge in the magazine.
Figure 29:
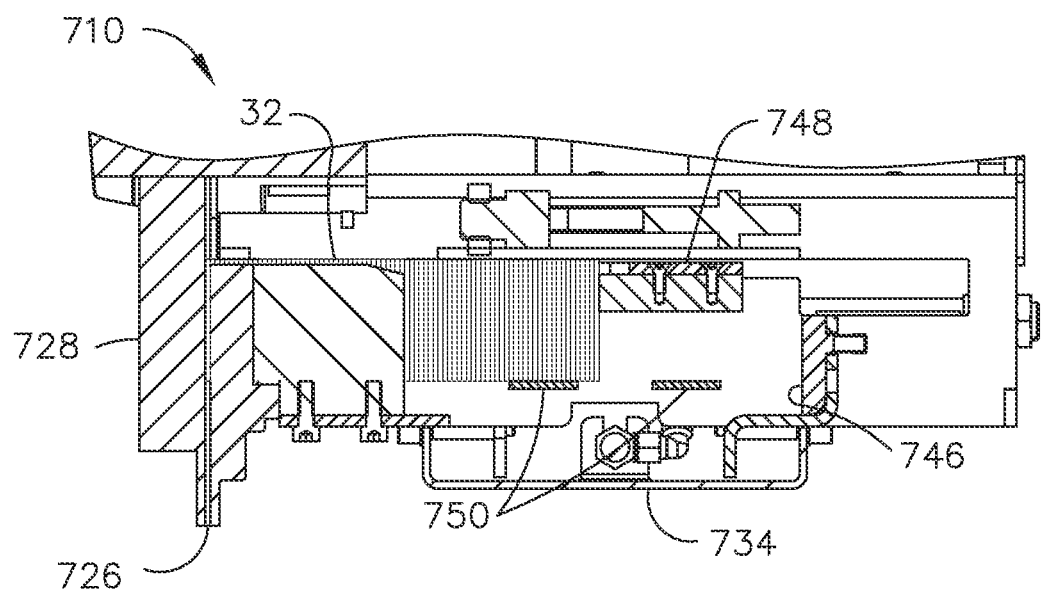
FIG. 29 is a left side cutaway view of the tool of FIG. 26, showing the position of a cartridge in the magazine during operation of the tool after several of the fasteners have been driven.

FIGS. 28 and 29 depict the magazine pusher 748 in use with a fastener cartridge 32. In FIG. 28, a fresh cartridge 32 has been loaded into the magazine 730. The magazine pusher 748 is at its most distal position from the guide body 728, and the magazine pusher 748 provides a force that pushes the cartridge 32 towards the guide body 728. As the tool 710 begins to drive fasteners 32, the magazine pusher 748 continuously pushes the cartridge 32 towards the guide body 728 in order to sequentially load fasteners into the guide body to then be driven into a substrate.

Referring now to FIG. 29, the magazine pusher 748 has travelled from right to left (in this view) somewhat closer to the guide body 728. The cartridge 32 has been continuously biased towards the left (in this view) by the magazine pusher 748, in order to continuously load fasteners into the guide body 728. The magazine pusher's 748 'right to left' movement continues until the tool stops operations, or the cartridge 32 is completely used.

Fourth Alternative Embodiment

Figure 37:
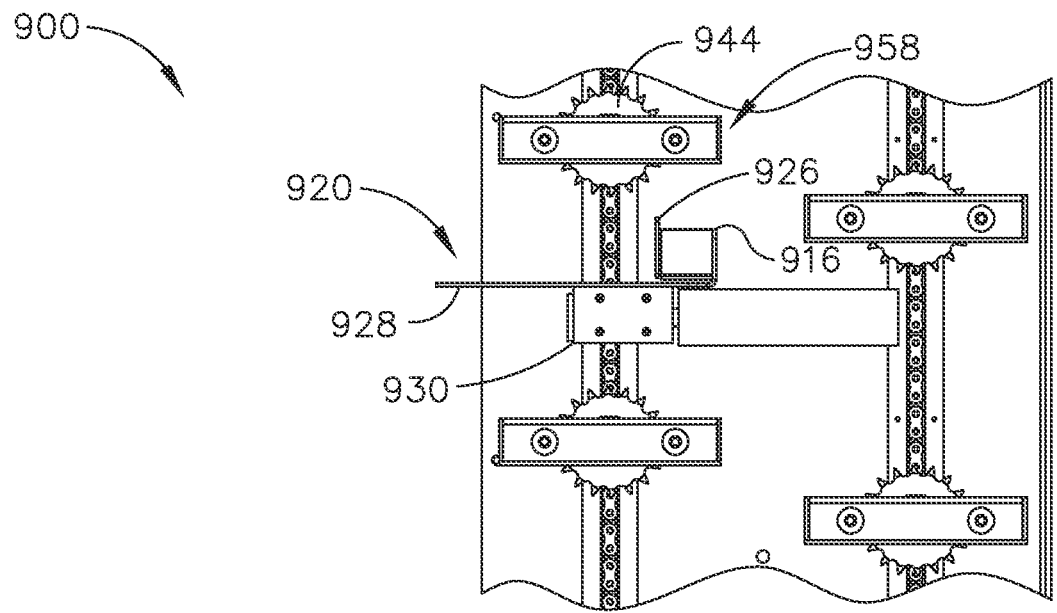
FIG. 37 is a partial left side view of a fourth alternative embodiment of a high-capacity automatic fastener loading station, as constructed according to the principles of the technology disclosed herein.

Referring now to FIG. 37, a fourth alternative embodiment loading station is generally designated by the reference numeral 900. The loader 900 includes a plurality of gears 944 and associated carriers 958, a guide sub-assembly ('S/A') 920 including: a pusher 916, a vertical portion 926, a horizontal portion 928, and a loading arm 930. In FIG. 37, the loading arm 930 is depicted in a retracted position.

Figure 38:
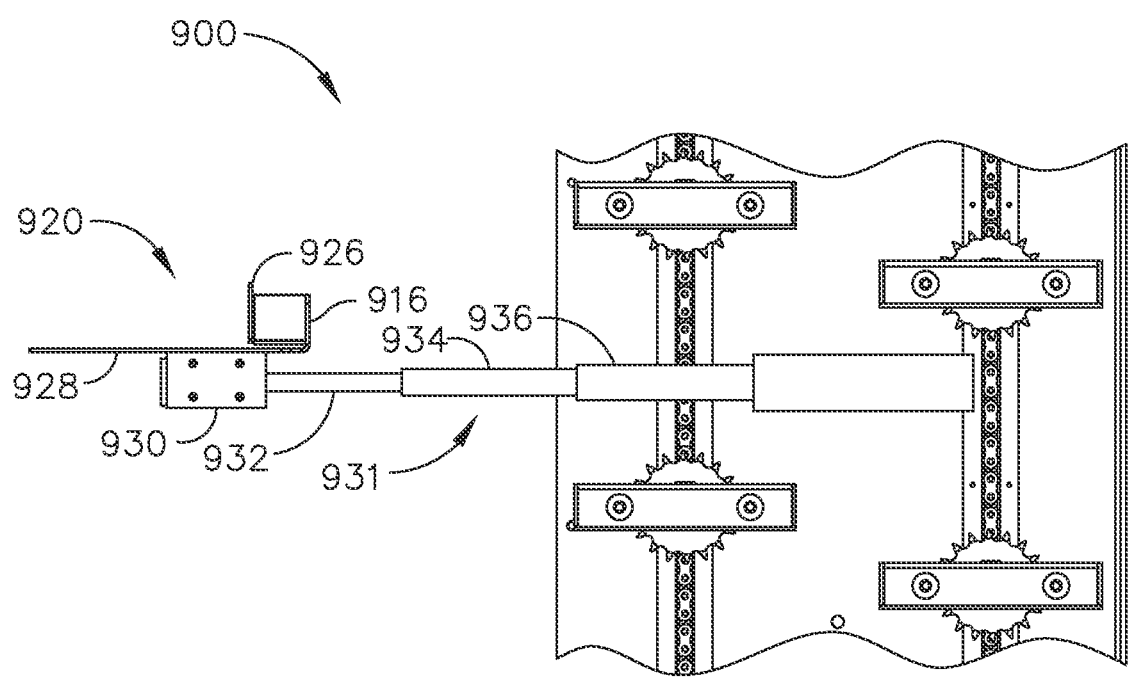
FIG. 38 is a partial left side view of the loading station of FIG. 37, showing a telescoping loading arm extended.

Referring now to FIG. 38, the loading arm 930 is depicted in an extended position. A telescoping arm 931 is shown fully extended, which allows the loading arm 930 to reach far enough into the magazine of the automatic fastener driving tool to successfully load a cartridge of fasteners. The telescoping arm 931 is comprised of at least two ultrathin independent slide portions that are used for a double telescopic movement. This telescopic movement allows the loading arm 930 to extend far enough to load a cartridge of fasteners into the magazine (as shown in previous embodiments). In FIG. 38, the telescoping arm 931 is depicted with three telescoping portions, indicated as a first telescoping portion 932, a second telescoping portion 934, and a third telescoping portion 936.

Electronic Block Diagram

Figure 39:
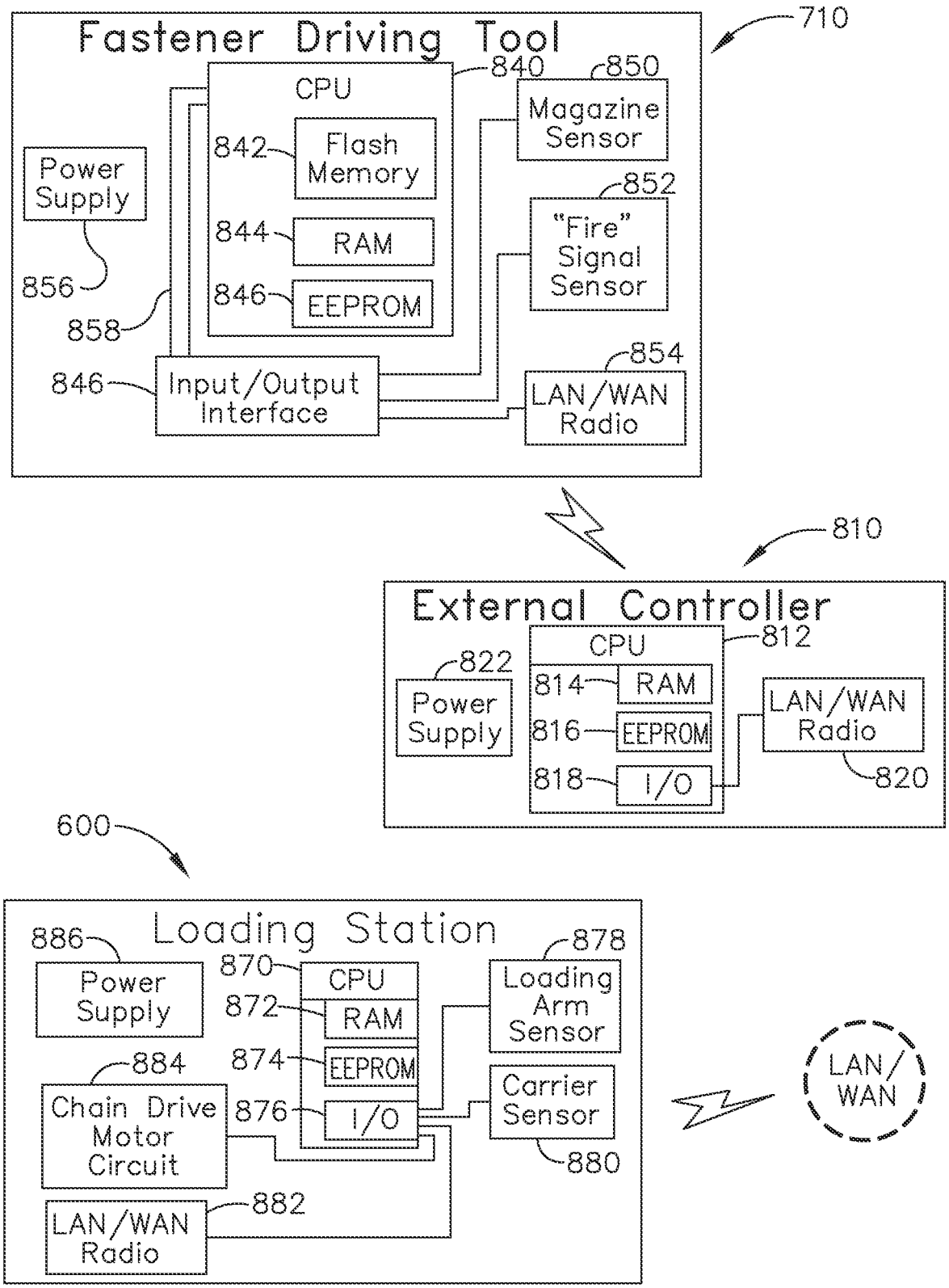
FIG. 39 is a schematic block diagram of the major electrical components of the automatic driving tool, the loading station, and an external controller, as constructed according to the principles of the technology disclosed herein.

Referring now to FIG. 39, the electronic circuitry of the fastener driving tool 710, the loading station 600, and the external controller 810 are illustrated in a block diagram. In this illustrated embodiment, the fastener driving tool 710 includes the microprocessor (CPU) 840, FLASH memory 842, random access memory (RAM) 844, EEPROM (electrically erasable programmable read only memory) 846, and a power supply (such as a battery) 856.

An input/output (I/O) interface circuit 848 is included to provide signal conditioning as needed between the CPU 840 and other components that typically use voltage and/or current levels that are not typically able to hook up directly to a processing device, such as sensors. Each appropriate I/O signal is directed through a separate channel of the I/O interface circuit 848, unless perhaps more than one signal of a particular voltage and current rating can be multiplexed, in which case a multiplexer circuit can be included in the I/O interface circuit 848. The data signals between I/O circuit 848 and the CPU 840 run through a low voltage signal bus 856.

A data interface in the form of a LAN/WAN radio 854 is included in this embodiment so that the CPU 840 is able to communicate with other external devices, such as the external controller 810. The external controller 810 also includes a LAN/WAN radio 820, which communicates with radio 854 using a protocol that could be proprietary, if desired. However, the radios 854 and 820 could use any number of various communications protocols, such as Bluetooth, although the data structure in the messages between radios 854 and 820 certainly could be encrypted, or otherwise formatted in a proprietary manner. Radios 854 and 820 further could comprise other types of wireless communications devices that may not operate on a strictly radio principle, including types of wireless communications devices that have not been invented as of yet.

Microprocessor 840 controls the operation of the tool 710 according to programmed instructions received from the external controller 810 and stored in a memory circuit, such as in FLASH memory 842. RAM memory 844 is typically used to store various data elements such as counters, software variables and other informational data. EEPROM memory 846 is typically used to store more permanent tool data such as operational cycles, configuration information, and other important data. It will be understood that many different types of microprocessors or microcontrollers could be used in the tool 710, and that many different types of memory circuits could be used to store data in both volatile and non-volatile form, without departing from the principles disclosed herein.

The power supply 856 provides the operating electrical power for the tool 710. It will be understood that the power supply 856 could be a battery, or an external power source. A magazine sensor 850 can be used to notify the CPU 840 (or alternatively, the external controller 810) when the magazine 730 is empty or full. A 'fire' feedback signal sensor 852 can be used to notify the CPU 840 or the external controller 810 when a fastener has been driven. This 'fire' feedback signal sensor 852 is preferably a linear high-resolution sensor that can implement fault handling and proof of firing, by combining the movement of a fastener with the presence of a 'fire' feedback signal, in milliseconds. The external controller 810 includes a microprocessor (CPU) 812, RAM (random access memory) 814, EEPROM (electrically erasable programmable read only memory) 816, and a power supply (such as a battery) 822.

An input/output (I/O) interface circuit 818 is included to provide signal conditioning as needed between the CPU 812 and other components that typically use voltage and/or current levels that are not typically able to hook up directly to a processing device, such as sensors. Each appropriate I/O signal is directed through a separate channel of the I/O interface circuit 818, unless perhaps more than one signal of a particular voltage and current rating can be multiplexed, in which case a multiplexer circuit can be included in the I/O interface circuit 818. The data signals between I/O circuit 818 and the CPU 812 run through a low voltage signal bus.

Microprocessor 812 controls the operation of the external controller 810 according to programmed instructions stored in a memory circuit. It will be understood that many different types of microprocessors or microcontrollers could be used in the external controller 810, and that many different types of memory circuits could be used to store data in both volatile and non-volatile form, without departing from the principles disclosed herein.

The power supply 822 provides the operating electrical power for the external controller 810. It will be understood that the power supply 822 could be a battery, or an external power source. In a production line environment, AC line voltage would generally be available, and the power supply 822 would typically be a DC power supply to provide direct current at an appropriate voltage level for the controller and for any sensors and input/output interface circuits being used in this system.

The loading station 600 includes a microprocessor (CPU) 870, random access memory (RAM) 872, EEPROM (electrically erasable programmable read only memory) 874, and a power supply (such as a battery) 886. An input/output (I/O) interface circuit 876 is included to provide signal conditioning as needed between the CPU 870 and other components that typically use voltage and/or current levels that are not typically able to hook up directly to a processing device, such as sensors. Each appropriate I/O signal is directed through a separate channel of the I/O interface circuit 876, unless perhaps more than one signal of a particular voltage and current rating can be multiplexed, in which case a multiplexer circuit can be included in the I/O interface circuit 848. The data signals between I/O circuit 876 and the CPU 870 run through a low voltage signal bus.

An optional data interface in the form of a LAN/WAN radio 882 is included in this embodiment so that the CPU 870 is able to communicate with other external devices. The radio 882 could use any number of various communications protocols, such as Bluetooth, although the data structure in the messages certainly could be encrypted, or otherwise formatted in a proprietary manner. Radio 882 further could comprise other types of wireless communications devices that may not operate on a strictly radio principle, including types of wireless communications devices that have not been invented as of yet.

The microprocessor 870 controls the operation of the loading station 600 according to programmed instructions stored in a memory circuit. It will be understood that many different types of microprocessors or microcontrollers could be used in the loading station 600, and that many different types of memory circuits could be used to store data in both volatile and non-volatile form, without departing from the principles disclosed herein.

The power supply 886 provides the operating electrical power for the loading station 600, including a chain drive motor circuit 884. The motor circuit 884 drives the motor 606. It will be understood that the power supply 856 could be a battery, or an external power source. A loading arm sensor 878 can be used to notify the CPU 870 when the loading arm is empty, full, extended, or retracted. A carrier sensor 880 can be used to notify the CPU 870 if one of the plurality of carriers is loaded or unloaded.

Note that some of the embodiments illustrated herein do not have all of their components included on some of the figures herein, for purposes of clarity. To see examples of such outer housings and other components, especially for earlier designs, the reader is directed to other U.S. patents and applications owned by Kyocera Senco. Similarly, information about "how" the electronic controller operates to control the functions of the tool is found in other U.S. patents and applications owned by Kyocera Senco. Moreover, other aspects of the present tool technology may have been present in earlier fastener driving tools sold by the Assignee, Kyocera Senco Industrial Tools, Inc., including information disclosed in previous U.S. patents and published applications. Examples of such publications are patent numbers U.S. Pat. Nos. 6,431,425; 5,927,585; 5,918,788; 5,732,870; 4,986,164; 4,679,719; 8,011,547, 8,267,296, 8,267,297, 8,011,441, 8,387,718, 8,286,722, 8,230,941, 8,602,282, 9,676,088, 10,478,954, 9,993,913, 10,549,412, 10,898,994, 10,821,585 and 8,763,874; also published U.S. patent application No. 2020/0156228, published U.S. patent application No. 2021/0016424, published U.S. patent application No. 2020/0070330, published U.S. patent application No. 2020/0122308, and U.S. provisional patent application No. 63/331,993 filed on Apr. 18, 2022. These documents are incorporated by reference herein, in their entirety.

It will also be understood that the precise logical operations depicted in the flow chart of FIG. 17, and discussed above, could be somewhat modified to perform similar, although perhaps not exact, functions without departing from the principles of the technology disclosed herein.

As used herein, the term "proximal" can have a meaning of closely positioning one physical object with a second physical object, such that the two objects are perhaps adjacent to one another, although it is not necessarily required that there be no third object positioned therebetween. In the technology disclosed herein, there may be instances in which a "male locating structure" is to be positioned "proximal" to a "female locating structure." In general, this could mean that the two (male and female) structures are to be physically abutting one another, or this could mean that they are "mated" to one another by way of a particular size and shape that essentially keeps one structure oriented in a predetermined direction and at an X-Y (e.g., horizontal and vertical) position with respect to one another, regardless as to whether the two (male and female) structures actually touch one another along a continuous surface. Or, two structures of any size and shape (whether male, female, or otherwise in shape) may be located somewhat near one another, regardless if they physically abut one another or not; such a relationship could still be termed "proximal." Or, two or more possible locations for a particular point can be specified in relation to a precise attribute of a physical object, such as being "near" or "at" the end of a stick; all of those possible near/at locations could be deemed "proximal" to the end of that stick. Moreover, the term "proximal" can also have a meaning that relates strictly to a single object, in which the single object may have two ends, and the "distal end" is the end that is positioned somewhat farther away from a subject point (or area) of reference, and the "proximal end" is the other end, which would be positioned somewhat closer to that same subject point (or area) of reference.

It will be understood that the various components that are described and/or illustrated herein can be fabricated in various ways, including in multiple parts or as a unitary part for each of these components, without departing from the principles of the technology disclosed herein. For example, a component that is included as a recited element of a claim hereinbelow may be fabricated as a unitary part; or that component may be fabricated as a combined structure of several individual parts that are assembled together. But that "multi-part component" will still fall within the scope of the claimed, recited element for infringement purposes of claim interpretation, even if it appears that the claimed, recited element is described and illustrated herein only as a unitary structure.

All documents cited in the Background and in the Detailed Description are, in relevant part, incorporated herein by reference; the citation of any document is not to be construed as an admission that it is prior art with respect to the technology disclosed herein.

The foregoing description of a preferred embodiment has been presented for purposes of illustration and description. It is not intended to be exhaustive or to limit the technology disclosed herein to the precise form disclosed, and the technology disclosed herein may be further modified within the spirit and scope of this disclosure. Any examples described or illustrated herein are intended as non-limiting examples, and many modifications or variations of the examples, or of the preferred embodiment(s), are possible in light of the above teachings, without departing from the spirit and scope of the technology disclosed herein. The embodiment(s) was chosen and described in order to illustrate the principles of the technology disclosed herein and its practical application to thereby enable one of ordinary skill in the art to utilize the technology disclosed herein in various embodiments and with various modifications as are suited to particular uses contemplated. This application is therefore intended to cover any variations, uses, or adaptations of the technology disclosed herein using its general principles. Further, this application is intended to cover such departures from the present disclosure as come within known or customary practice in the art to which this technology disclosed herein pertains and which fall within the limits of the appended claims.

What is claimed is:

1. An automatic fastener loader, comprising:
an outer housing that includes an inlet loading portion, a main holding portion, and a dispensing outlet portion;
the inlet loading portion comprises a first opening that is sized and shaped to receive at least one cartridge, the at least one cartridge containing a plurality of fasteners;
the main holding portion is sized and shaped to contain a plurality of the at least one cartridge; and
the dispensing outlet portion comprises a second opening that is sized and shaped to dispense the at least one cartridge;
wherein:
(a) the outer housing at least partially encloses a plurality of movable shelves that each are sized and shaped to hold the at least one cartridge;
(b) the plurality of movable shelves are connected to a drive system that moves the movable shelves from the inlet loading portion to the dispensing outlet portion, while having the ability to carry the at least one cartridge; and
(c) as one of the plurality of movable shelves reaches the dispensing outlet portion, the drive system allows the at least one cartridge to be moved through the second opening, and thereby unloaded from the automatic fastener loader
(d) the at least one cartridge comprises a plurality of fastener strips arranged next to each other, in which the fasteners face in a downward direction.

2. The automatic fastener loader of claim 1, wherein: the drive system comprises at least one continuous chain that is connected to the plurality of movable shelves, and moves the individual movable shelves through a rotation inside the loader from the inlet loading portion to the dispensing outlet portion, and then back to the inlet loading portion.

3. The automatic fastener loader of claim 2, wherein: the drive system uses a plurality of sprockets to act as a prime mover for the at least one continuous chain.

4. The automatic fastener loader of claim 1, wherein the dispensing outlet portion includes a mechanical guide that assists in correctly placing the at least one cartridge into a receiving opening of a magazine for a fastener driving tool.

5. The automatic fastener loader of claim 1, wherein:
the fasteners comprise at least one of:
staples;
pins;
nails; or
brads.

6. The automatic fastener loader of claim 5, wherein:
the staples each comprise a width arm, two legs of the same length that are attached to the ends of the arm, and create a bottom opening between the legs.

7. An automatic fastener loader, comprising:
an outer housing that includes an inlet loading portion, a main holding portion, and a dispensing outlet portion;
the inlet loading portion comprises a first opening that is sized and shaped to receive at least one cartridge, the at least one cartridge containing a plurality of fasteners;
the main holding portion is sized and shaped to contain a plurality of the at least one cartridge;
the dispensing outlet portion comprises a second opening that is sized and shaped to dispense the at least one cartridge;
a motor that is in mechanical communication with at least one chain drive, in which the at least one chain drive includes a continuous chain; and
a first plurality of movable carriers, and a second, opposite plurality of movable carriers, such that the first and second plurality of movable carriers are positioned so as to not be in contact with each other, and to exhibit an open space therebetween;
the first and second plurality of movable carriers are connected in pairs to the continuous chain of the at least one chain drive such that each one of the first plurality of movable carriers faces each one of the second plurality of movable carriers, and the chain drive moves the pairs of movable carriers from the inlet loading portion to the dispensing outlet portion, while each of the pairs of movable carriers is operable to carry the at least one cartridge; and as one of the pairs of movable carriers reaches the dispensing outlet portion, the chain drive allows the at least one cartridge to be moved through the second opening, and thereby unloaded from the automatic fastener loader;

wherein:

the outer housing at least partially encloses the first and second plurality of movable carriers, and the at least one chain drive.

8. The automatic fastener loader of claim 7, wherein: the at least one chain drive comprises:

a first chain drive that includes a first plurality of gears, and includes a first continuous chain that is driven by the first plurality of gears, and travels through a rotation inside the outer housing from the inlet loading portion to the dispensing outlet portion, and then back to the inlet loading portion;

a second chain drive that includes a second plurality of gears, and includes a second continuous chain that is driven by the second plurality of gears, and travels through a rotation inside the outer housing from the inlet loading portion to the dispensing outlet portion, and then back to the inlet loading portion;

the first plurality of movable carriers is connected to the first chain drive;

the second plurality of movable carriers is connected to the second chain drive;

the first chain drive and the second chain drive are operable to rotate together if the motor is actuated; and each pair of the plurality of movable carriers moves together such that the first plurality of movable carriers remains substantially parallel to the second plurality of movable carriers.

9. The automatic fastener loader of claim 8, wherein:

as the at least one chain drive moves, each pair of movable carriers moves from a position above a loading arm to a position below a loading arm; and as one of the pairs of movable carriers moves to the position below the loading arm, one of the at least one of the cartridges is loaded onto the loading arm.

10. The automatic fastener loader of claim 8, wherein:

the loading arm comprises a double-telescoping arm, including:

a first independent slide portion, and a second independent slide portion.

* * * * *